United States Patent
Akahori et al.

(10) Patent No.: US 10,525,345 B2
(45) Date of Patent: *Jan. 7, 2020

(54) GAME PROGRAM AND GAME APPARATUS

(71) Applicant: Nintendo Co., Ltd., Kyoto (JP)

(72) Inventors: Eiji Akahori, Tokyo (JP); Shingo Miyata, Tokyo (JP); Toshiharu Izuno, Kyoto (JP); Takuji Hotta, Kyoto (JP); Kentaro Nishimura, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/131,253

(22) Filed: Sep. 14, 2018

(65) Prior Publication Data
US 2019/0099670 A1  Apr. 4, 2019

Related U.S. Application Data

(63) Continuation of application No. 15/376,881, filed on Dec. 13, 2016, now Pat. No. 10,092,837, which is a (Continued)

(30) Foreign Application Priority Data

May 9, 2006  (JP) .................................. 2006-130777

(51) Int. Cl.
*A63F 13/422* (2014.01)
*A63F 13/5258* (2014.01)
(Continued)

(52) U.S. Cl.
CPC ............ *A63F 13/422* (2014.09); *A63F 13/42* (2014.09); *A63F 13/44* (2014.09);
(Continued)

(58) Field of Classification Search
CPC ................ A63F 13/803; A63F 13/5258; A63F 2300/8017; A63F 2300/64;
(Continued)

(56) References Cited

U.S. PATENT DOCUMENTS

| | | |
|---|---|---|
| 5,618,179 A | 4/1997 | Copperman et al. |
| 6,126,545 A | 10/2000 | Takahashi |

(Continued)

FOREIGN PATENT DOCUMENTS

| | | |
|---|---|---|
| JP | A-H11-123279 | 5/1999 |
| JP | 2004-236799 | 8/2004 |

OTHER PUBLICATIONS

JP Office Action, "Notice of Reasons for Rejections", dated Dec. 12, 2011 for corresponding Japanese patent Application No. 2006-130777, 2 pages.

(Continued)

*Primary Examiner* — William H McCulloch, Jr.
(74) *Attorney, Agent, or Firm* — Nixon & Vanderhye P.C.

(57) ABSTRACT

A forward direction line is set on a course, in a virtual game world, on which a player object is allowed to move. An advancing direction at a current position of the player object is determined based on the forward direction line. The advancing direction is determined as a direction in which the player object advances so as to control a movement of a player character in accordance with an acceleration instruction, and a leftward-rightward movement instruction from a player. Consequently, it is possible to assist the player in controlling a direction in which an object operated by the player moves.

20 Claims, 16 Drawing Sheets

Related U.S. Application Data continuation of application No. 11/797,279, filed on May 2, 2007, now Pat. No. 9,550,123.

(51) Int. Cl.
*A63F 13/803* (2014.01)
*A63F 13/44* (2014.01)
*A63F 13/42* (2014.01)
*A63F 13/55* (2014.01)
*A63F 13/573* (2014.01)
*A63F 13/40* (2014.01)
*A63F 13/45* (2014.01)

(52) U.S. Cl.
CPC .......... *A63F 13/5258* (2014.09); *A63F 13/55* (2014.09); *A63F 13/803* (2014.09); *A63F 13/40* (2014.09); *A63F 13/45* (2014.09); *A63F 13/573* (2014.09); *A63F 2300/1062* (2013.01); *A63F 2300/6045* (2013.01); *A63F 2300/6054* (2013.01); *A63F 2300/638* (2013.01); *A63F 2300/64* (2013.01); *A63F 2300/646* (2013.01); *A63F 2300/6684* (2013.01); *A63F 2300/8017* (2013.01); *A63F 2300/8047* (2013.01)

(58) Field of Classification Search
CPC ........ A63F 2300/646; A63F 2300/8047; A63F 2300/6045; A63F 2300/1062; A63F 2300/638; A63F 13/42; A63F 13/40; A63F 13/422; A63F 13/44; A63F 13/55
See application file for complete search history.

(56) References Cited

U.S. PATENT DOCUMENTS

| | | | |
|---|---|---|---|
| 6,141,014 A | 10/2000 | Endo | |
| 6,261,179 B1 | 7/2001 | Miyamoto | |
| 6,304,267 B1 | 10/2001 | Sata | |
| 6,409,596 B1 | 6/2002 | Hayashida | |
| 6,508,708 B1 | 1/2003 | Okubo | |
| 6,652,376 B1 | 11/2003 | Yoshida et al. | |
| 7,023,434 B2 | 4/2006 | Takahashi et al. | |
| 7,479,064 B2 | 1/2009 | Waitani et al. | |
| 7,582,010 B2 | 9/2009 | Takahashi et al. | |
| 7,582,015 B2 | 9/2009 | Onoda et al. | |
| 7,601,055 B2 | 10/2009 | Eika | |
| 7,618,322 B2 | 11/2009 | Shimizu et al. | |
| 7,722,450 B2 | 5/2010 | Onoda et al. | |
| 7,806,767 B2 | 10/2010 | Kitao | |
| 7,909,698 B2 | 3/2011 | Onoda et al. | |
| 7,953,521 B2 | 5/2011 | Tipping et al. | |
| 8,029,348 B2 | 10/2011 | Suzuki | |
| 8,038,531 B2 | 10/2011 | Sato | |
| 8,057,290 B2 | 11/2011 | Vance et al. | |
| 8,393,961 B2 | 3/2013 | Suzuki | |
| 8,400,445 B2 | 3/2013 | Katano | |
| 8,614,672 B2 | 12/2013 | Ohta | |
| 8,866,856 B2 | 10/2014 | Iwamoto | |
| 8,900,058 B2 | 12/2014 | Wakitani | |
| 9,550,123 B2 * | 1/2017 | Akahori | A63F 13/10 |
| 9,901,814 B2 | 2/2018 | Nonaka | |
| 10,092,837 B2 * | 10/2018 | Akahori | A63F 13/10 |
| 10,293,253 B2 * | 5/2019 | Taka | A63F 13/42 |
| 2003/0109296 A1 | 6/2003 | Leach et al. | |
| 2004/0058730 A1 | 3/2004 | Ouchi | |
| 2004/0121829 A1 | 6/2004 | Reed | |
| 2004/0219978 A1 | 11/2004 | Teramoto et al. | |
| 2004/0219980 A1 | 11/2004 | Bassett et al. | |
| 2004/0235543 A1 | 11/2004 | Eika | |
| 2004/0259059 A1 | 12/2004 | Aoki et al. | |
| 2004/0266506 A1 | 12/2004 | Herbrich et al. | |
| 2005/0012740 A1 | 1/2005 | Takahashi et al. | |
| 2005/0014543 A1 | 1/2005 | Itoi et al. | |
| 2005/0037843 A1 | 2/2005 | Wells et al. | |
| 2005/0056997 A1 | 3/2005 | Wikitani et al. | |
| 2005/0085297 A1 | 4/2005 | Onoda et al. | |
| 2005/0096110 A1 | 5/2005 | Ohyagi et al. | |
| 2005/0101364 A1 | 5/2005 | Onoda et al. | |
| 2005/0130740 A1 | 6/2005 | Onoda et al. | |
| 2005/0245315 A1 | 11/2005 | Shimizu et al. | |
| 2005/0288099 A1 | 12/2005 | Shimizu et al. | |
| 2006/0035691 A1 | 2/2006 | Nystrom et al. | |
| 2006/0154713 A1 | 7/2006 | Sunazuka et al. | |
| 2007/0072662 A1 | 3/2007 | Templeman | |
| 2007/0111768 A1 | 5/2007 | Tipping et al. | |
| 2007/0155458 A1 | 7/2007 | Tipping et al. | |
| 2007/0209436 A1 | 9/2007 | Akita et al. | |
| 2007/0249415 A1 | 10/2007 | Okubo | |
| 2007/0265042 A1 | 11/2007 | Akahori et al. | |
| 2007/0265074 A1 | 11/2007 | Akahori et al. | |
| 2007/0265087 A1 * | 11/2007 | Akahori | A63F 13/10 463/37 |
| 2008/0096623 A1 | 4/2008 | Fuji et al. | |
| 2009/0005139 A1 | 1/2009 | Morimoto | |
| 2009/0061972 A1 | 3/2009 | Tipping et al. | |
| 2009/0070093 A1 | 3/2009 | Nakanishi et al. | |
| 2009/0209309 A1 | 8/2009 | Wu et al. | |
| 2010/0048271 A1 | 2/2010 | Champagne et al. | |
| 2010/0160013 A1 | 6/2010 | Sanders | |
| 2010/0173687 A1 | 7/2010 | Tipping et al. | |
| 2010/0240430 A1 | 9/2010 | Tipping et al. | |
| 2011/0059783 A1 | 3/2011 | Tipping et al. | |
| 2011/0074768 A1 | 3/2011 | Takayama | |
| 2011/0214093 A1 | 9/2011 | Nishimura et al. | |
| 2012/0196681 A1 | 8/2012 | Shmizu et al. | |
| 2017/0087463 A1 * | 3/2017 | Akahori | A63F 13/10 |
| 2017/0151497 A1 * | 6/2017 | Taka | A63F 13/42 |
| 2018/0197334 A1 * | 7/2018 | Kitazono | G06T 19/003 |
| 2019/0099670 A1 * | 4/2019 | Akahori | A63F 13/10 |

OTHER PUBLICATIONS

Mandemaker, Jorik. "Donkey Kong Jungle Beat for Nintendo Gamecube FAQ and walkthrough." GameFAQs. Copyright 2005. Last updated Feb. 25, 2005. Accessed Jun. 11, 2013. <http://www.gamefaqs.com/gamecube/920789-donkey-kong-jungle-beat/faqs/35280>.

* cited by examiner

F I G. 4
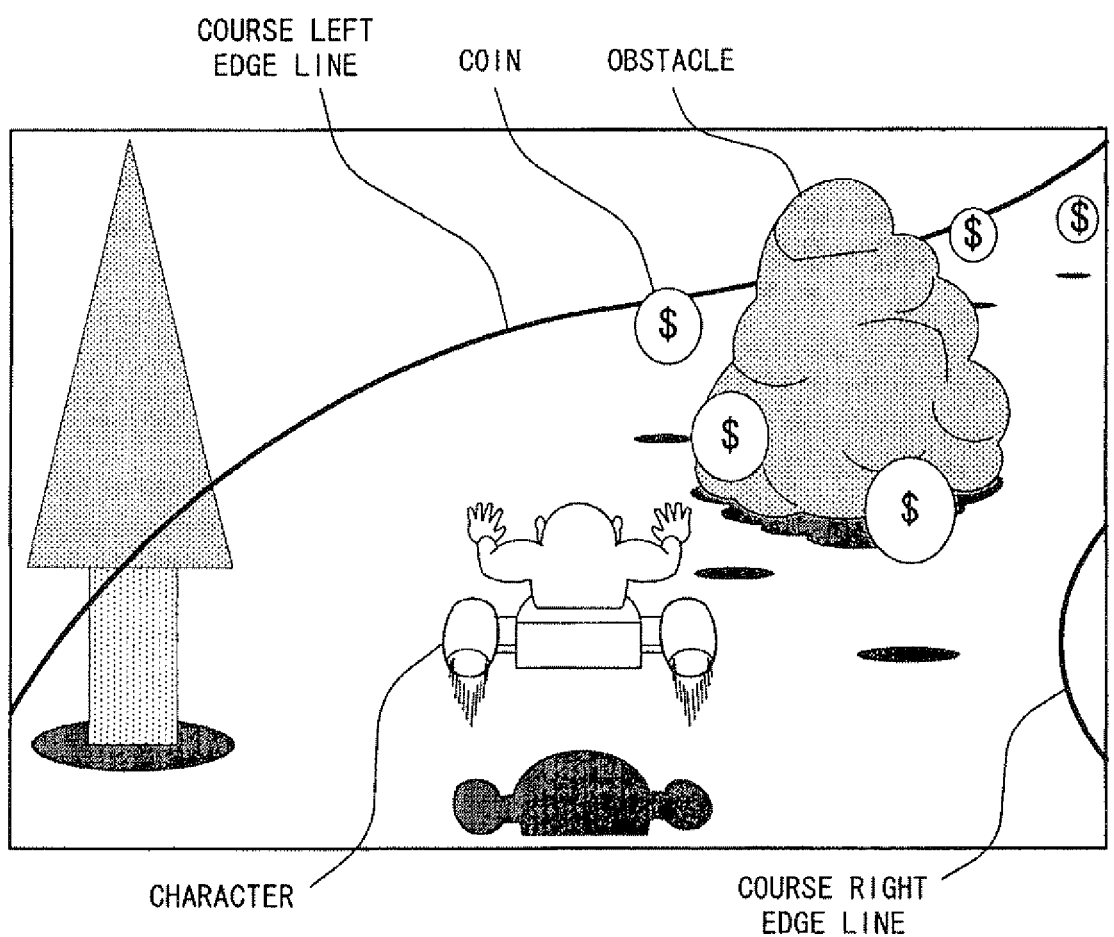

GAME PROGRAM AND GAME APPARATUS

CROSS REFERENCE TO RELATED APPLICATION

This application is a continuation of U.S. patent application Ser. No. 15/376,881 filed Dec. 13, 2016, which is a continuation application of U.S. patent application Ser. No. 11/797,279, filed May 2, 2007 now U.S. Pat. No. 9,550,123, which claims priority to Japanese Patent Application No. 2006-130777, filed May 9, 2006, the entire contents of each of which are hereby incorporated by reference.

FIELD

The technology herein relates to a game program and a game apparatus for moving a player object in a virtual game world in accordance with an operation performed by a player.

BACKGROUND AND SUMMARY

Japanese Laid-Open Patent Publication No. 2004-236799 (hereinafter, referred to as Patent Document 1) discloses that, when an object operated by a player goes around a curve, a movement speed of the object is corrected in accordance with a position of the object on the curve. For example, when the object is on an inner curve, the movement speed thereof is corrected so as to be increased. On the other hand, when the object is on an outer curve, the movement speed thereof is corrected so as to be reduced. Thus, when a speed at which the object approaches the curve is too high and therefore the object is likely to slide off the course at the curve, the movement speed thereof is automatically reduced. Consequently, the object is able to go around the curve without sliding off the course.

However, in the technique disclosed in Patent Document 1, the speed is corrected whereas a moving direction is never corrected.

Therefore, certain example embodiments provide a game program and a game apparatus capable of subsidiarily determining a moving direction of an object operated by a player.

Certain example embodiments have the following features to attain the object mentioned above. The reference numerals in the parentheses are provided to indicate an exemplary correspondence with the drawings in order to aid in understanding certain example embodiments and are not intended to limit, in any way, the scope of the present invention.

A computer-readable storage medium according to certain example embodiments has stored thereon a game program for moving a player object in a virtual game world in accordance with an operation performed by a player. The game program causes a computer (31) of a game apparatus (3) to function as follows:

display control means (S36) for displaying the player object on a screen of a display device (2);

advancing direction determination means (S18) for determining, by using data (43) used for determining an advancing direction of the player object set in the virtual game world, the advancing direction at a current position of the player object in the virtual game world, the advancing direction representing a direction in which the player object advances;

advance instruction detection means for detecting for an advance instruction inputted by the player using an input device (6) for advancing the player object; and advancing movement control means (S20, S28, S30) for moving or accelerating, in accordance with the advance instruction from the player having been detected by the advance instruction detection means, the player object in the advancing direction having been determined by the advancing direction determination means.

Here, the "data used for determining an advancing direction" is predetermined data for determining, in the virtual game world, the advancing direction at one of positions or in one of areas in the virtual game world. The "data used for determining an advancing direction" may be direction data (direction vector) representing a direction in the virtual game world, a plural pieces of positional data representing a plurality of positions associated with each other in the virtual game world (in this case, the plurality of positions represented by the plural pieces of positional data are connected to each other so as to represent a direction), or a predetermined equation for determining the direction vector. Such data is set for each of the positions or each of the areas in the virtual game world. Further, such data may be set for some of the positions or some of the areas, and for each of the remaining other positions, data for a position, among said some of the positions, adjacent to said each of the remaining other positions may be used, and for each of the remaining other areas, data for an area, among said some of the areas, adjacent to said each of the remaining other areas may be used. Further, for the remaining other positions or the remaining other areas, approximation or interpolation may be used. The "advancing direction" represents, for example, a course direction in a game, such as a race game, for allowing a player object to advance along the course in the virtual game world.

The orientation (attitude) of the character may not necessarily correspond to the advancing direction of the character.

Further, the game program stored in the computer-readable storage medium according to certain example embodiments may cause the computer to further function as follows:

leftward-rightward movement direction determination means (S18) for determining, by using the data used for determining the advancing direction, a leftward-rightward movement direction at the current position of the player object in the virtual game world, the leftward-rightward movement direction representing one of a left direction and a right direction in which the player object moves; leftward-rightward movement instruction detection means for detecting for a leftward-rightward movement instruction inputted by the player using the input device for moving the player object in one of the left direction and the right direction; and leftward-rightward movement control means (S22, S28, S30) for moving or accelerating, in accordance with the leftward-rightward movement instruction from the player having been detected by the leftward-rightward movement instruction detection means, the player object in the leftward-rightward movement direction having been determined by the leftward-rightward movement direction determination means.

Further, the data used for determining the advancing direction may contain coordinate values (60) of a plurality of control points, in the virtual game world, which are arranged in sequence. The advancing direction determination means may determine the advancing direction in accordance with at least a first vector from a first control point which is nearest to the current position of the player object among the plurality of control points to a second control point, among the plurality of control points, which immediately precedes or immediately follows, in the sequence, the first control point.

Further, the advancing direction determination means may determine the advancing direction by using a second vector from the second control point to a third control point, among the plurality of control points, immediately preceding or immediately following the second control point in the sequence.

Here, the control points represent data which are arranged in sequence starting with the control point nearest to the position of the player object in the virtual game world at a predetermined time (for example, a time at which a game starts or a time at which a predetermined condition is satisfied). When the control points are arranged in sequence of a first control point (the control point nearest to the position of the player object at the predetermined time), a second control point, a third control point, . . . , the second control point follows the first control point in the sequence.

Furthermore, a control point which is first in the sequence may be nearest, among the plurality of control points, to a point (start point) at which the player object is positioned in the virtual game world when a game is started, and the advancing direction determination means may determine the advancing direction by using a vector obtained based on at least two vectors including the first vector from the first control point to the second control point immediately following the first control point in the sequence, and a second vector from the second control point to a third control point immediately following the second control point in the sequence.

Here, the advancing direction determination means may determine, as the advancing direction, a vector obtained as an average (or weighted average) of the first vector and the second vector. Further, another vector (a third vector from the third control point to a fourth control point immediately following the third control point in the sequence) may be used.

Moreover, a fourth vector from the first control point to a fifth control point immediately preceding the first control point in the sequence may be used.

Further, a course on which the player object is allowed to move is set in the virtual game world, and the plurality of control points may be set on the course.

Moreover, the display control means may generate, by using a virtual camera set in the virtual game world, a game image including the player object, and the game program stored in the computer-readable storage medium according to certain example embodiments causes the computer to further function as follows, virtual camera control means (S34) for determining, in accordance with the advancing direction at a point which follows the current position of the player object and is distanced from the current position of the player object by a predetermined distance, a direction in which the virtual camera is oriented so as to pick up an image.

"A predetermined distance" may not be necessarily "constant", and may be changed each time, for example, the course is changed or each time an area set in the course is changed.

Further, "a point which follows the current position of the player object and is distanced from the current position of the player object by a predetermined distance" may be, for example, a point obtained by moving forward a position on the forward direction line corresponding to the current position of the player object along the forward direction line by a predetermined distance, or a point obtained by moving, by a predetermined distance (which may be a constant distance, or a distance based on a current movement speed), a position on the forward direction line corresponding to the current position of the player object in the advancing direction in which the player object is currently advancing or the moving direction in which the player object is currently moving. "The advancing direction at a point which follows the current position of the player object and is distanced from the current position of the player object by a predetermined distance" is obtained by subjecting, to a similar process performed by the advancing direction determination means, the aforementioned "point which follows the current position of the player object and is distanced from the current position of the player object by a predetermined distance".

Further, the game apparatus may include a first operation section (6R) and a second operation section (6L), and the advance instruction detection means may detect that the first operation section and the second operation section are alternately operated, and the leftward-rightward movement instruction detection means may detect that one of the first operation section and the second operation section is solely operated.

Here, the advance instruction detection means detects that the first operation section and the second operation section are alternately operated. On the other hand, the leftward-rightward movement instruction detection means detects that one of the first operation section and the second operation section is solely operated ("solely" is used for a case where one of the first and the second operation sections is operated one time or one of the first and the second operation sections is continuously operated). For example, operation histories of the first operation section and the second operation section are stored in a memory of the game apparatus (when a plurality of the operation histories are stored, the operation histories are stored in orderly sequence). When the first operation section is operated (or each time the first operation section is operated), whether the first operation section has been operated for an immediately preceding time or the second operation section has been operated for an immediately preceding time is determined, and when the first operation section has been operated for the immediately preceding time, it is determined that the first operation section is solely operated, and when the second operation section has been operated for the immediately preceding time, it is determined that the first operation section and the second operation are alternately operated. On the other hand, when the second operation section is operated, whether the first operation section has been operated for an immediately preceding time or the second operation section has been operated for an immediately preceding time is determined, and when the second operation section has been operated for the immediately preceding time, it is determined that the second operation section is solely operated, and when the first operation section has been operated for the immediately preceding time, it is determined that the first operation section and the second operation section are alternately operated. When the first operation section and the second operation section are not operated for a predetermined time period, the operation history information having been stored may be cleared. In this case, an operation performed for the first time after the operation history information has been cleared may be determined as a start of a new series of operations. When the first operation section or the second operation section is operated at a start of a series of operations, the player object may be moved forward, the player object may be moved in the right or left direction, or the player object may not be moved. Further, when the first operation section is continuously operated three or more times, it may be determined that the first operation section is solely operated. The same can be said for the second operation section. Furthermore, when the first operation section and the second operation section are alternately and continuously operated three or more times, it may be determined that the first operation section and the second operation section are alternately operated. Moreover, when another operation section (a third operation section) is provided in addition to the first operation section and the second operation section, the determination may be made regardless of the third operation section having been operated or the determination may be made in consideration the third operation section having been operated. For example, the first operation section, the third operation section, and the second operation section are operated in order, respectively. In this case, when the determination is made regardless of the third operation section having been operated, it is determined that the first operation section and the second operation section are alternately operated, and when the determination is made in consideration of the third operation section having been operated, the first operation section and the second operation section are not alternately operated.

Further, another computer-readable storage medium according to certain example embodiments has stored thereon a game program for moving a player object in a virtual game world in accordance with an operation performed by a player. The game program causes a computer (31) of a game apparatus (3) to function as follows:

display control means (S36) for displaying the player object on a screen of a display device (2);

leftward-rightward movement direction determination means (S18) for determining, by using data (43) used for determining a leftward-rightward movement direction of the player object set in the virtual game world, the leftward-rightward movement direction at a current position of the player object in the virtual game world, the leftward-rightward movement direction representing one of a left direction and a right direction in which the player object moves;

leftward-rightward movement instruction detection means for detecting for a leftward-rightward movement instruction inputted by the player using an input device (6) for moving the player object in one of the left direction and the right direction; and leftward-rightward movement control means (S22, S28, S30) for moving or accelerating, in accordance with the leftward-rightward movement instruction from the player having been detected by the leftward-rightward movement instruction detection means, the player object in the leftward-rightward movement direction having been determined by the leftward-rightward movement direction determination means.

Here, the "data used for determining a leftward-rightward movement direction" is predetermined data for determining, in the virtual game world, the leftward-rightward movement direction at a position or an area in the virtual game world. The "data used for determining a leftward-rightward movement direction" may be direction data (direction vector) representing a direction in the virtual game world, a plural pieces of positional data representing a plurality of positions associated with each other in the virtual game world (in this case, the plurality of positions represented by the plural pieces of positional data are connected to each other so as to represent a direction), or a predetermined equation for determining the direction vector. Further, the "data used for determining a leftward-rightward movement direction" may be data representing the advancing direction. In this case, the leftward-rightward movement direction determination means determines the leftward-rightward movement direction based on the data representing the advancing direction. For example, the "leftward-rightward movement direction" represents a left-right direction relative to the course direction in a game, such as a race game, for allowing a player object to advance along the course in the virtual game world. The "leftward-rightward movement direction" is typically a direction perpendicular to the course direction. Further, the "leftward-rightward movement direction" may form a predetermined angle (excluding zero degree) with the course direction. Preferably, the leftward movement direction and the rightward movement direction may be symmetrical with respect to the course direction, or the leftward movement direction and the rightward movement direction may be aligned in straight line.

The other computer-readable storage medium according to certain example embodiments has stored thereon a game program for moving a player object in a virtual game world in accordance with an operation performed by a player. The game program causes a computer (31) of a game apparatus (3) to function as follows:

display control means (S36) for displaying the player object on a screen of a display device (2);

orthogonal movement direction determination means (S18) for determining, by using data (43) used for determining an orthogonal movement direction of the player object set in the virtual game world, the orthogonal movement direction at a current position of the player object in the virtual game world, the orthogonal movement direction representing a direction orthogonal to an advancing direction representing a direction in which the player object advances;

orthogonal movement instruction detection means for detecting for an orthogonal movement instruction inputted by the player using an input device (6) for moving the player object in the orthogonal movement direction; and orthogonal movement control means (S22, S28, S30) for moving or accelerating, in accordance with the orthogonal movement instruction from the player having been detected by the orthogonal movement instruction detection means, the player object in the orthogonal movement direction having been determined by the orthogonal movement direction determination means.

Here, the "orthogonal movement direction" represents a direction orthogonal to the advancing direction (for example, the course direction). For example, the "orthogonal movement direction" may be the left-right direction relative to the advancing direction, or may be the upward-downward direction relative to the advancing direction.

A game apparatus according to certain example embodiments executes a game for moving a player object in a virtual game world in accordance with an operation performed by a player, and comprises the following means:

display control means (31, S36) for displaying the player object on a screen of a display device (2);

advancing direction determination means (31, S18) for determining, by using data (43) used for determining an advancing direction of the player object set in the virtual game world, the advancing direction at a current position of the player object in the virtual game world, the advancing direction representing a direction in which the player object advances;

advance instruction detection means (31) for detecting for an advance instruction inputted by the player using an input device (6) for advancing the player object; and advancing movement control means (31, S20, S28, S30) for moving or accelerating, in accordance with the advance instruction from the player having been detected by the advance instruction detection means, the player object in the advancing direction having been determined by the advancing direction determination means.

Another game apparatus according to certain example embodiments executes a game for moving a player object in a virtual game world in accordance with an operation performed by a player, and comprises the following means:

display control means (31, S36) for displaying the player object on a screen of a display device (2);

leftward-rightward movement direction determination means (31, S18) for determining, by using data (43) used for determining a leftward-rightward movement direction of the player object set in the virtual game world, the leftward-rightward movement direction at a current position of the player object in the virtual game world, the leftward-rightward movement direction representing one of a left direction and a right direction in which the player object moves; and leftward-rightward movement instruction detection means (31) for detecting for a leftward-rightward movement instruction inputted by the player using an input device (6) for moving the player object in one of the left direction and the right direction; and leftward-rightward movement control means (31, S22, S28, S30) for moving or accelerating, in accordance with the leftward-rightward movement instruction from the player having been detected by the leftward-rightward movement instruction detection means, the player object in the leftward-rightward movement direction having been determined by the leftward-rightward movement direction determination means.

The other game apparatus according to certain example embodiments executes a game for moving a player object in a virtual game world in accordance with an operation performed by a player, and comprises the following means:

display control means (31, S36) for displaying the player object on a screen of a display device (2);

orthogonal movement direction determination means (31, S18) for determining, by using data (43) used for determining an orthogonal movement direction of the player object set in the virtual game world, the orthogonal movement direction at a current position of the player object in the virtual game world, the orthogonal movement direction representing a direction orthogonal to an advancing direction representing a direction in which the player object advances;

orthogonal movement instruction detection means (31) for detecting for an orthogonal movement instruction inputted by the player using an input device (6) for moving the player object in the orthogonal movement direction; and orthogonal movement control means (31, S22, S28, S30) for moving or accelerating, in accordance with the orthogonal movement instruction from the player having been detected by the orthogonal movement instruction detection means, the player object in the orthogonal movement direction having been determined by the orthogonal movement direction determination means.

According to certain example embodiments, it is possible to subsidiarily determine a moving direction of an object operated by a player.

These and other objects, features, aspects and advantages of certain example embodiments will become more apparent from the following detailed description when taken in conjunction with the accompanying drawings.

BRIEF DESCRIPTION OF THE DRAWINGS

FIG. 4 is a diagram illustrating an exemplary game image displayed on a screen of a television 2;

DETAILED DESCRIPTION

Hereinafter, a game system according to an embodiment will be described with reference to the drawings.

Figure 1:
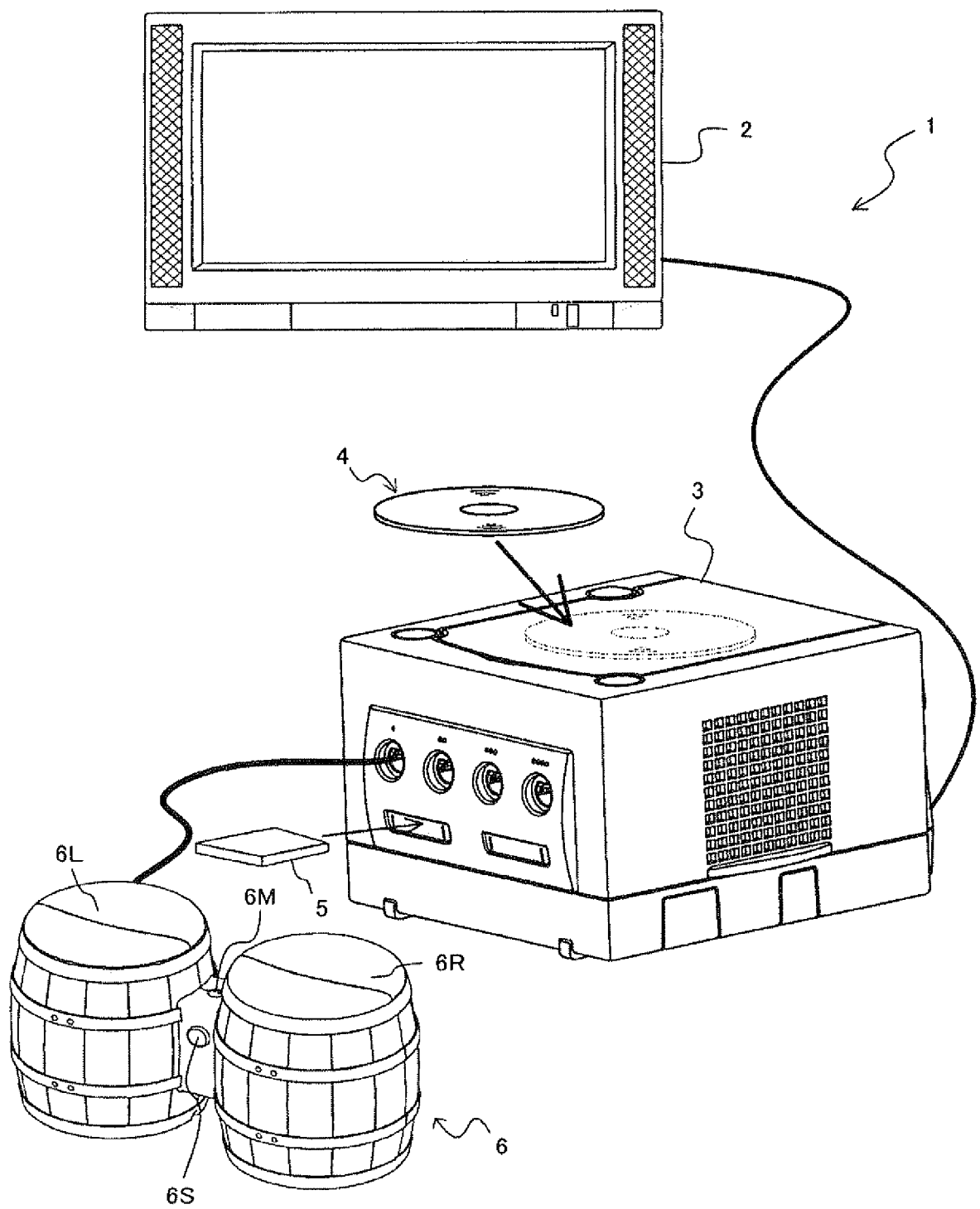
FIG. 1 is an external view illustrating a game system 1 according to an embodiment.

FIG. 1 is an external view showing a configuration of the game system according to the embodiment. As shown in FIG. 1, a game system 1 comprises a television 2, a game apparatus body 3, and a conga controller 6, and has mounted thereon a DVD-ROM 4 and a memory card 5. The DVD-ROM 4 and the memory card 5 are mounted on the game apparatus body 3 in a removable manner. The conga controller 6 is connected, by a communication cable, to any of four controller port connectors provided on the game apparatus body 3. The television 2 is connected to the game apparatus body 3 by an AV cable or the like. Note that, the game apparatus body 3 and the controller 6 may communicate with each other by radio communication.

The conga controller 6 is provided with a microphone 6M and three switches: a start button 6S; a right strike surface 6R; and a left strike surface 6L. As described herein below, a player can control a movement of a character in a virtual game world by hitting the right strike surface 6R or the left strike surface 6L.

Figure 2:
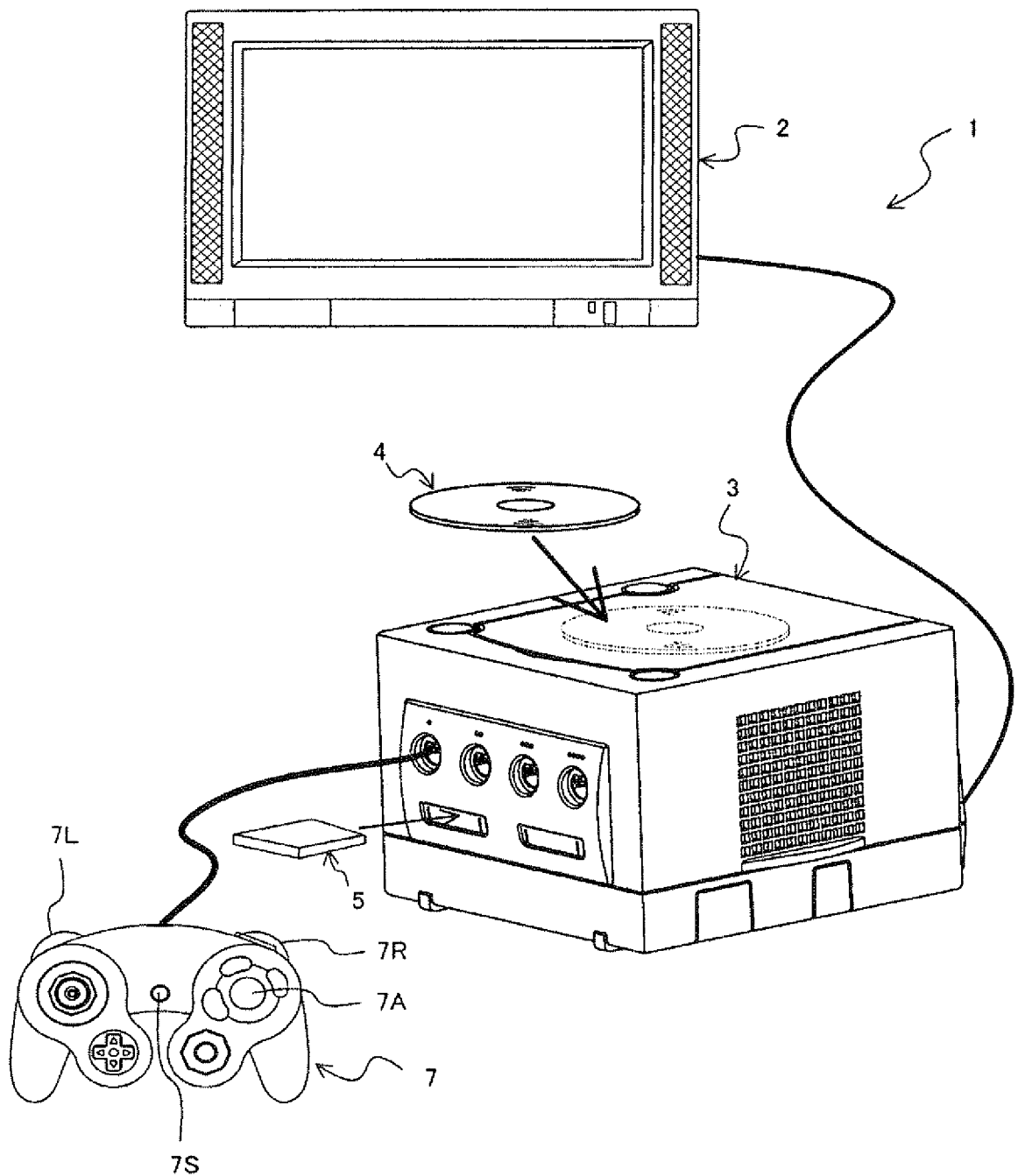
FIG. 2 is an external view illustrating the game system 1 using a commonly used controller.

Note that, a commonly used controller 7 as shown in FIG. 2 may be used instead of the conga controller 6. The controller 7 is provided with a plurality of switches such as a start button 7S, an A button 7A, an R button 7R and an L button 7L.

The DVD-ROM 4 fixedly stores a game program, game data and the like. The DVD-ROM 4 is mounted on the game apparatus body 3 when the player plays a game. Here, instead of the DVD-ROM 4, an external storage medium such as a CD-ROM, an MO, a memory card, a ROM cartridge or the like may be used as means for storing the game program and the like.

The game apparatus body 3 reads the game program stored in the DVD-ROM 4, and then performs a process in accordance with the read game program.

The television 2 displays, on a screen, image data outputted from the game apparatus body 3.

The memory card 5 has a rewritable storage medium, e.g., a flash memory, as a backup memory for storing data such as saved data of the game.

Figure 3:
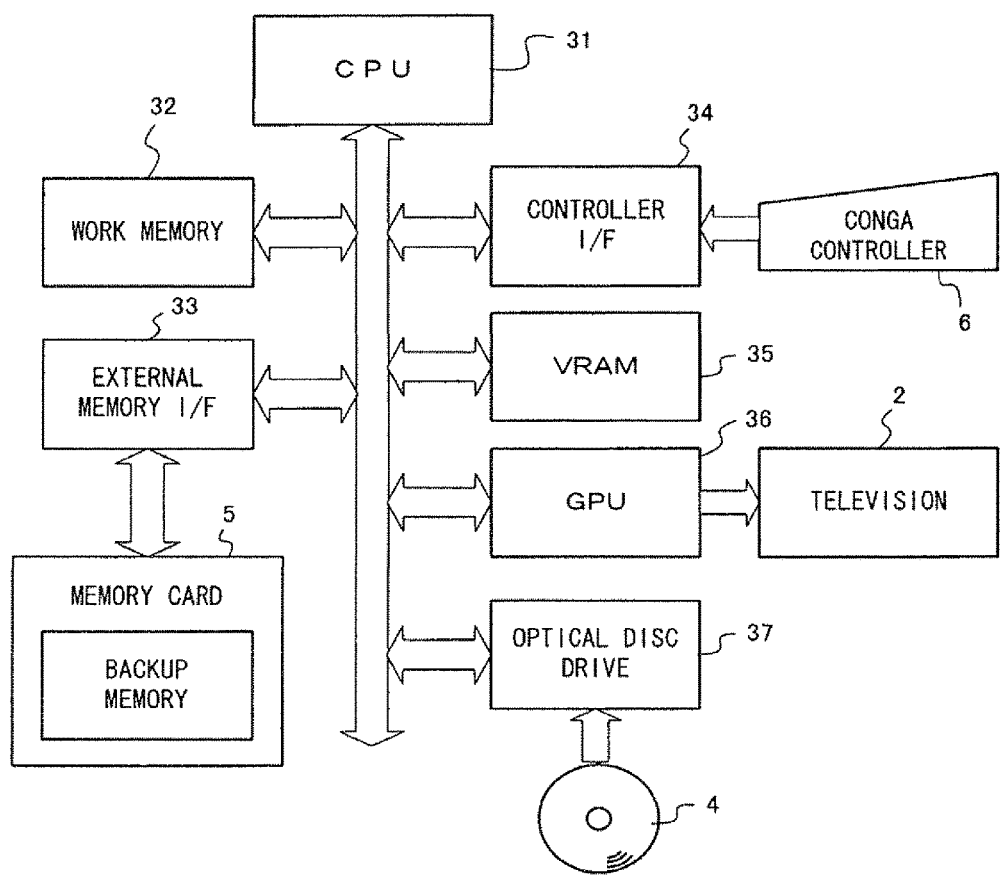
FIG. 3 is a block diagram showing an internal configuration of the game apparatus body 3.

FIG. 3 is a block diagram showing an internal configuration of the game apparatus body 3. Hereinafter, each component of the game system 1 will be described in more detail with reference to FIG. 3.

As shown in FIG. 3, the game apparatus body 3 comprises a CPU 31, a work memory 32, an external memory interface (I/F) 33, a controller interface (I/F) 34, a video RAM (VRAM) 35, a graphics processing unit (GPU) 36 and an optical disc drive 37.

In order for the game to start, the optical disc drive 37 drives the DVD-ROM 4 mounted on the game apparatus body 3, and then the game program stored in the DVD-ROM 4 is loaded into the work memory 32. The game starts when the CPU 31 executes the program in the work memory 32. After the game starts, the player plays the game by using the conga controller 6. In accordance with an operation performed by the player, the conga controller 6 outputs operation data to the game apparatus body 3. The operation data outputted from the conga controller 6 is supplied to the CPU 31 via the controller I/F 34. The CPU 31 performs a game process based on inputted operation data. The GPU 36 is used for image data generation and the like performed in the game process.

The GPU 36 performs, for coordinates of a solid model of an object or figure (e.g., an object comprised of polygons) placed in a three-dimensional virtual game world, arithmetic processing (e.g., rotation, scaling and deformation of the solid model, and coordinate transformation from a world coordinate system to a camera coordinate system or a screen coordinate system). Further, the GPU 36 generates a game image by writing, based on a predetermined texture, color data (RGB data) of each pixel of a solid model projected on the screen coordinate system into the VRAM 35. The GPU 36 thus generates the game image to be displayed on the television 2, and outputs the game image to the television 2 as necessary. Although the present embodiment shows a hardware configuration in which a memory dedicated for image processing (VRAM 35) is separately provided, other memory configurations may be provided. For example, a UMA (Unified Memory Architecture) system, in which a part of the work memory 32 is used as a memory for image processing, may be used.

The work memory 32 stores various programs and pieces of data loaded from the DVD-ROM 4. These pieces of data include, for example, data, which is related to polygons comprising a three-dimensional model placed in the virtual game world, and a texture used for coloring the polygons.

FIG. 4 shows an exemplary game image displayed on the screen of the television 2. While certain example embodiments may apply to a race game, other embodiments may be applied to any type of game.

On the screen of the television 2, a race course set in the virtual game world, a player character to be operated by a player, and obstacles and coins placed on the race course are displayed. The player uses the conga controller 6 to operate the player character such that the number of times the player character hits against the obstacles is minimized, the number of coins the player character obtains is maximized, and the player character reaches a goal as quickly as possible.

A player is allowed to input, by using the conga controller 6, instructions such as an acceleration instruction, a rightward movement instruction, a leftward movement instruction, and a deceleration instruction.

It is possible to input the acceleration instruction when the right strike surface 6R and the left strike surface 6L of the conga controller 6 are alternately hit repeatedly. When the acceleration instruction is inputted, the character accelerates forward (that is, in the direction (hereinafter, referred to as "advancing direction") in which the character advances). At this time, the faster the right strike surface 6R and the left strike surface 6L are alternately hit repeatedly (for example, as the number of times per second the right strike surface 6R and the left strike surface 6L are alternately hit repeatedly is increased), the greatly the character is accelerated.

It is possible to input the rightward movement instruction when the right strike surface 6R of the conga controller 6 is repeatedly hit. When the rightward movement instruction is inputted, the character moves in the right direction (in the right direction relative to the advancing direction of the character). At this time, the faster a player repeatedly hits the right strike surface 6R, the faster the character moves in the right direction.

It is possible to input the leftward movement instruction when the left strike surface 6L of the conga controller 6 is repeatedly hit. When the leftward movement instruction is inputted, the character moves in the left direction (in the left direction relative to the advancing direction of the character). At this time, the faster a player repeatedly hits the left strike surface 6L, the faster the character moves in the left direction.

It is possible to input the deceleration instruction when the right strike surface 6R and the left strike surface 6L of the conga controller 6 are long-pressed for more than a predetermined time period. When the deceleration instruction is inputted, the character decelerates.

Figure 5:
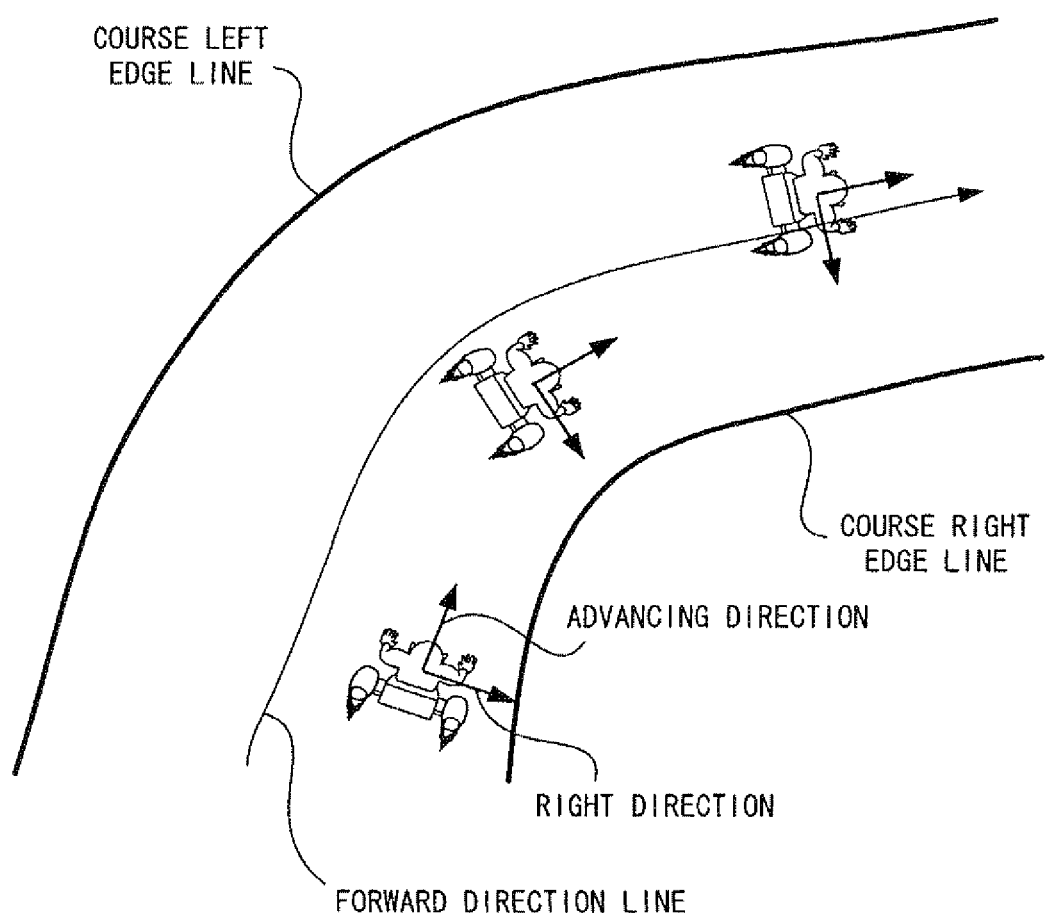
FIG. 5 is a diagram illustrating a relationship between a forward direction line and an advancing direction of a character.
Figure 18:
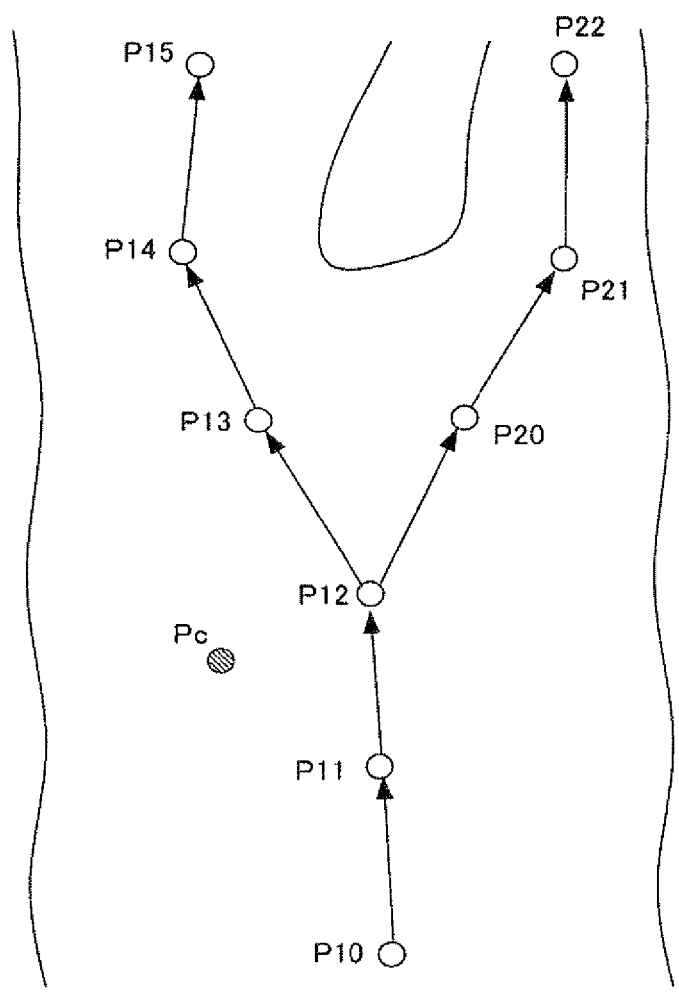
FIG. 18 is a diagram illustrating a specific example of the forward direction line.
Figure 19:
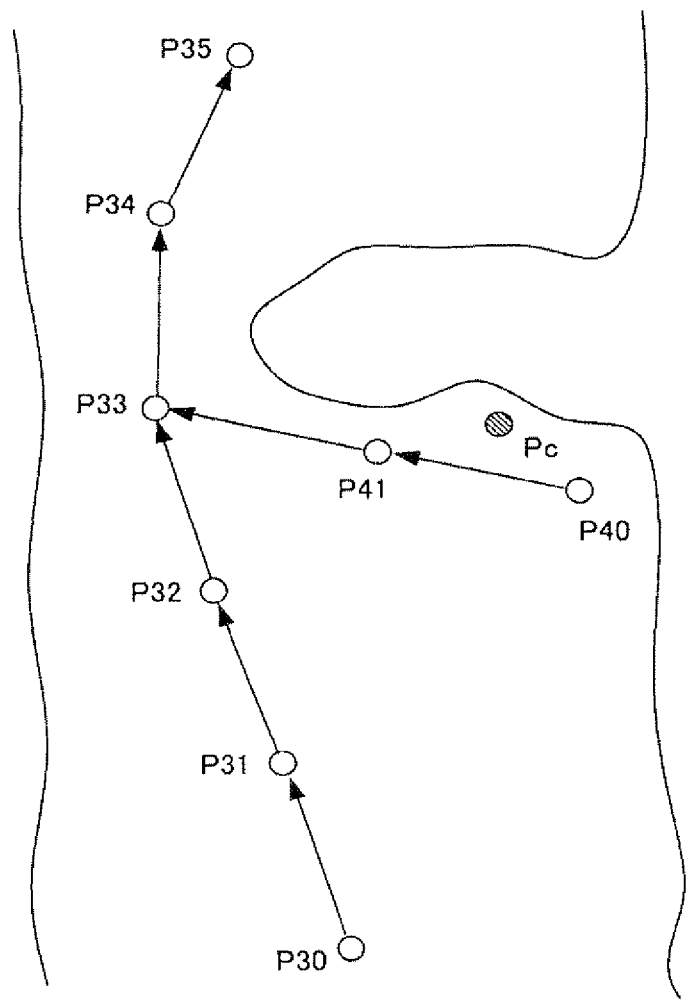
FIG. 19 is a diagram illustrating another specific example of the forward direction line.

In the present embodiment, as shown in FIG. 5, a forward direction line is set along the race course in the virtual game world, and the advancing direction of the character is updated, as necessary, so as to continue to be parallel to the forward direction line. When a player inputs the acceleration instruction described above, a component representing a forward speed of the character has its magnitude increased. Similarly, when a player inputs the deceleration instruction described above, a component representing a forward speed of the character has its magnitude reduced. The forward direction line may be set such that one forward direction line is branched into a plurality of forward direction lines as shown in FIG. 18, or a plurality of forward direction lines are merged into one forward direction line as shown in FIG. 19.

The right direction for the character is the rightward direction relative to the advancing direction of the character, and is also perpendicular to the advancing direction of the character. When a player inputs the rightward movement instruction described above, the character moves in the right direction. When a player inputs the leftward movement instruction described above, the character moves in the direction opposite to the right direction.

As described above, in the present embodiment, the advancing direction of the character is updated as necessary so as to continue to be parallel to the forward direction line. Therefore, when the character goes around a curve, the player does not need to take into consideration the current moving direction of the character and is allowed to easily move the character toward the inner curve (for example, toward the vicinity of the course right line) or toward the outer curve (for example, toward the vicinity of the course left line) by simply inputting the rightward movement instruction or the leftward movement instruction. In particular, in a conventional race game, when a steering wheel is too sharply turned on a curve, the character may be turned toward the direction perpendicular to the course direction or toward the direction opposite to the course direction. In this case, it is troublesome to turn and move the character in a correct direction again. However, according to the present embodiment, such a state can be avoided, thereby greatly enhancing the controllability.

Hereinafter, an operation performed by the game apparatus body 3 according to the present embodiment will be described in detail.

Figure 6:
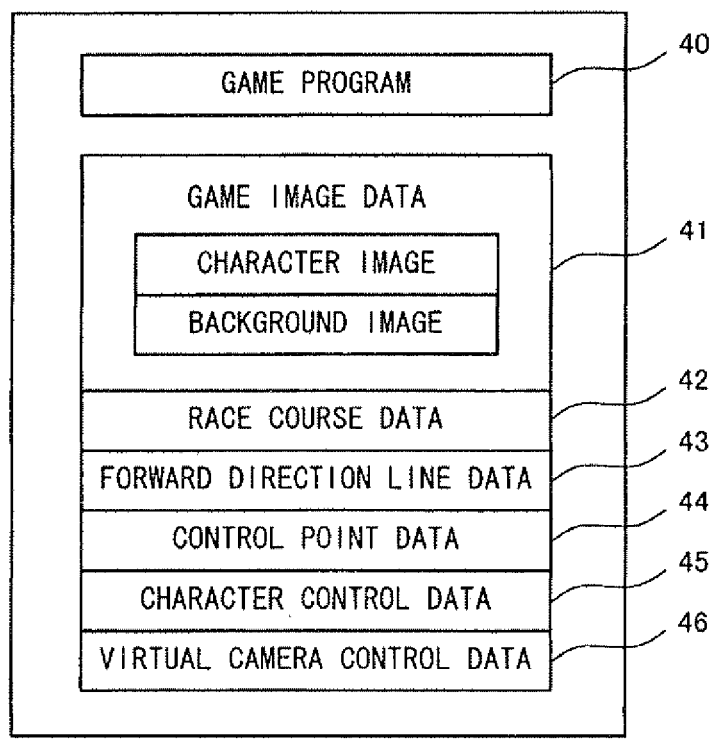
FIG. 6 is a diagram illustrating a memory map of a work memory 32.

FIG. 6 shows a memory map of the work memory 32. The work memory 32 stores a game program 40, game image data 41, race course data 42, forward direction line data 43, control point data 44, and character control data 45.

The game image data 41 includes data for a character image and data for a background image, and is used for generating a game image to be displayed on the screen of the television 2.

The race course data 42 represents a shape of a race course in the virtual game world.

Figure 13:
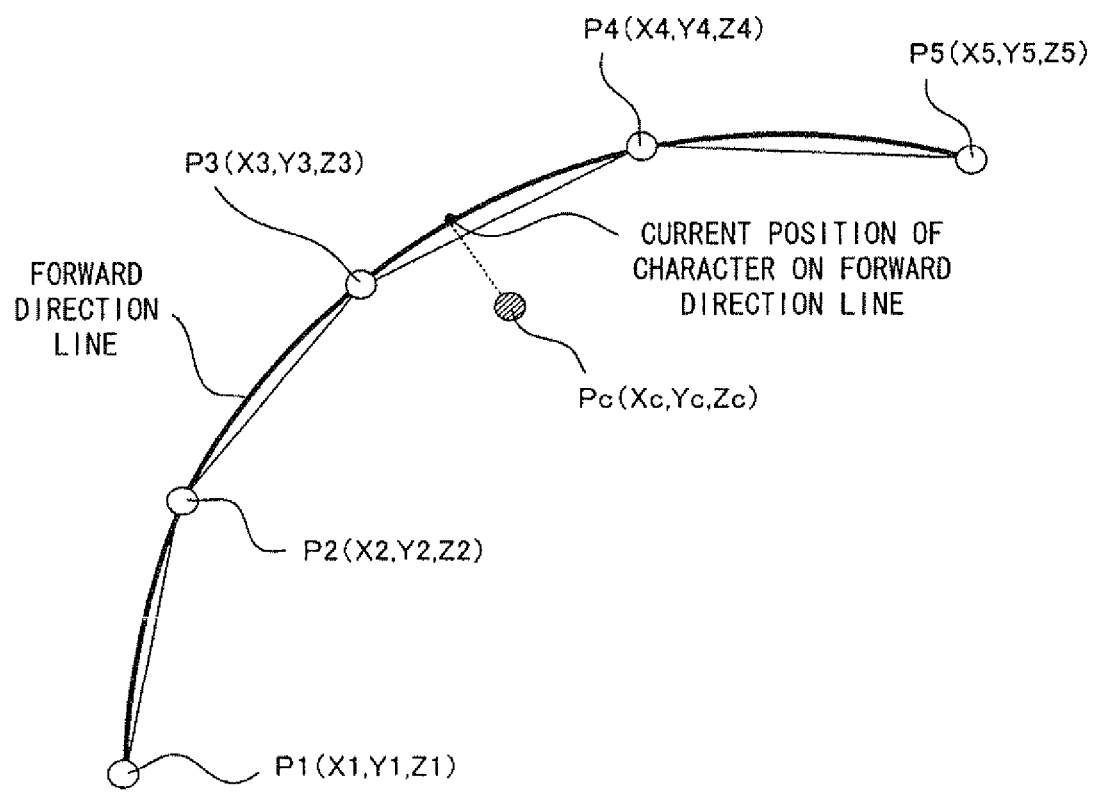
FIG. 13 is a diagram illustrating a relationship between the forward direction line and the control points.

The forward direction line data 43, representing the forward direction line shown in FIG. 5, is read from the DVD-ROM 4 and stored in the work memory 32 when the game is played. In the present embodiment, the forward direction line is defined by a collection of a plurality of control points (for example, P1, P2, P3, P4, P5 arranged in sequence as shown in FIG. 13, and P1 is a first control point (that is, a control point nearest to a start point) in the sequence) arranged in sequence. Although the plurality of control points represent discrete data, interpolation among the plurality of control points is performed using a spline curve as necessary so as to obtain the continuous smooth forward direction line.

Figure 7:
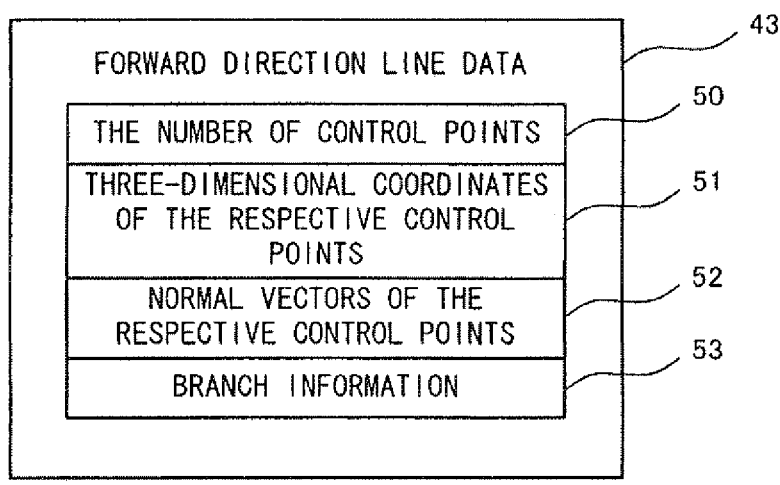
FIG. 7 is a diagram illustrating a specific example of forward direction line data 43.

FIG. 7 shows a specific example of the forward direction line data 43. In FIG. 7, the forward direction line data 43 contains the number of control points 50, three-dimensional coordinates of the respective control points 51, normal vectors of the respective control points 52, and branch information 53. The number of control points is, for example, 200 to 300 for each course. Further, each of the control points has the normal vector set therefor. The normal vector, representing a slope of the course at each of the control points, is a unit vector representing an upward direction which is perpendicular to the traveling surface. The branch information 53 represents a branching point (control point P12 shown in FIG. 18) and a merging point (control point P33 shown in FIG. 19) of the forward direction line.

In FIG. 6, when the game is started, the control point data 44 is set, for each of the control points, based on the forward direction line data 43.

Figure 8:
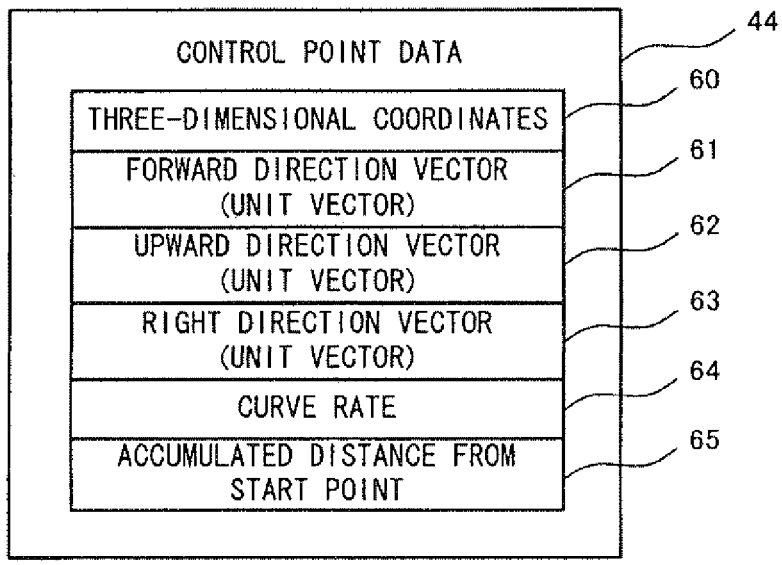
FIG. 8 is a diagram illustrating a specific example of control point data 44.

FIG. 8 shows a specific example of the control point data 44. In FIG. 8, the control point data 44 includes, for each of the control points, three-dimensional coordinates 60, a forward direction vector 61, an upward direction vector 62, a right direction vector 63, a curve rate 64, and an accumulated distance from a start point 65.

Further, the control points are arranged in sequence. This is not shown. For example, the sequence in which the control points are stored in a memory is the same as the sequence in which the control points are arranged. Each of the control points may have set therefor data representing its turn in the sequence, or may have set therefor information representing the control point immediately following said each of the control points.

The forward direction vector 61, the upward direction vector 62, and the right direction vector 63 are used to determine the advancing direction of the character, the right direction for the character, or the like as described above.

The forward direction vector 61 is a unit vector representing a direction in which the forward direction line extends from each of the control points. In other words, the forward direction vector 61 is a unit vector representing a direction of a line tangent to the forward direction line at each of the control points or a direction similar to the direction of the line tangent to the forward direction line. In the present embodiment, for example, the forward direction vector 61 of the control point P3 shown in FIG. 13 is obtained as an average between a unit vector representing a direction to the control point P3 from the control point P2 immediately preceding the control point P3 and a unit vector representing a direction from the control point P3 to the control point P4 immediately following the control point P3. The forward direction vector 61 and the like may be previously calculated and stored in the DVD-ROM 4, or may be calculated based on the three-dimensional coordinates of the control point when the game is started, or may be calculated as necessary during the game. In FIG. 13, the point Pc represents a current position of the character.

The upward direction vector 62 is the same as the normal vector 52 of the corresponding one of the control points.

The right direction vector 63 is a unit vector which represents the right direction relative to the advancing direction and is perpendicular to the forward direction vector 61 and the upward direction vector 62 of each of the control points. The right direction vector 63 is determined based on the forward direction vector 61 and the upward direction vector 62.

The curve rate 64 represents a curvature (that is, a curvature of the course) of the forward direction line at each of the control points. In the present embodiment, for example, the curve rate 64 of the control point P3 shown in FIG. 13 represents a relative angle between the vector from the control point P2 to the control point P3 and the vector from the control point P3 to the control point P4. Therefore, when a certain one of the control points has the curve rate 64 of zero, the forward direction line represents a straight line at the certain one of the control points. The larger the absolute value of the curve rate 64 is, the shaper curve the forward direction line of the control point represents.

The accumulated distance from a start point 65 represents a distance (a path) to each of the control points from a start point on the course in the virtual game world.

In FIG. 6, the character control data 45 is used to control a movement and an attitude of the character in the virtual game world. The character control data 45 is updated as necessary while the game is being played.

Figure 9:
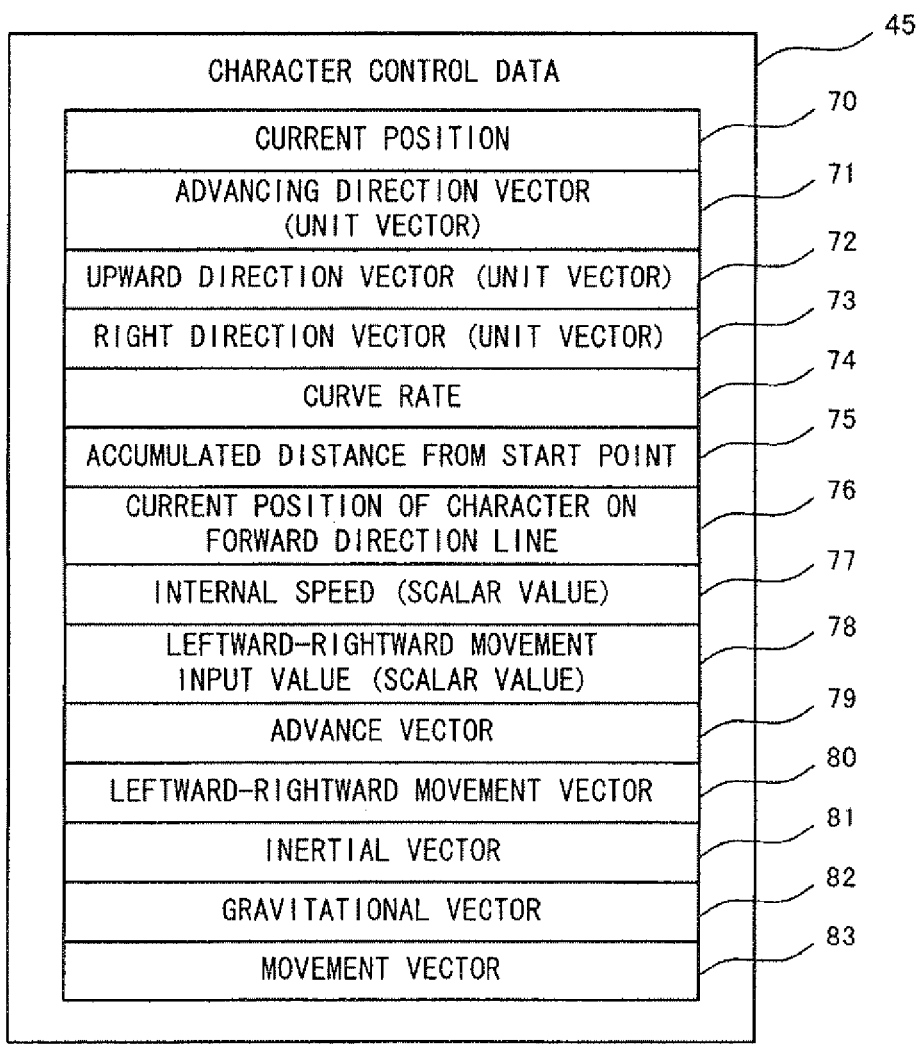
FIG. 9 is a diagram illustrating a specific example of character control data 45.

FIG. 9 shows a specific example of the character control data 45. In FIG. 9, the character control data 45 includes a current position 70, an advancing direction vector 71, an upward direction vector 72, a right direction vector 73, a curve rate 74, an accumulated distance from a start point 75, a current position of the character on the forward direction line 76, an internal speed 77, a leftward-rightward movement input value 78, an advance vector 79, a leftward-rightward movement vector 80, an inertial vector 81, a gravitational vector 82, and a movement vector 83.

The current position 70, represented as three-dimensional coordinates, indicates a current position of the character in the virtual game world.

The advancing direction vector 71 is a unit vector representing a direction in which the character advances as described above, as shown in FIG. 11. The advancing direction vector 71 of the character is determined by interpolation based on the forward direction vector 61 of each of two control points adjacent to the current position of the character. Here, the two control points adjacent to the current position of the character correspond to the control point which is nearest to the current position of the character, on the course, among the control points preceding the current position of the character, and the control point which is nearest to the current position of the character, on the course, among the control points following the current position of the character. The interpolation will be described below in detail.

Figure 11:
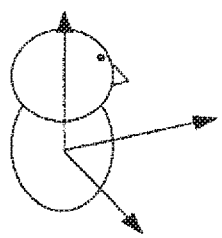
FIG. 11 is a diagram illustrating an advancing direction vector, a right direction vector, and an upward direction vector of the character.

The upward direction vector 72 is a unit vector representing the upward direction relative to the character as shown in FIG. 11. The upward direction vector 72 for the character is determined by interpolation based on the upward direction vector 62 of each of the two control points adjacent to the current position of the character in a similar manner to that for the advancing direction vector 71.

The right direction vector 73 is a unit vector representing the right direction relative to the character as described above, as shown in FIG. 11. The right direction vector 73 for the character is determined by interpolation based on the right direction vector 63 of each of the two control points adjacent to the current position of the character in a similar manner to that for the advancing direction vector 71.

The curve rate 74 represents a curvature (that is, a curvature of the course) of the forward direction line at the current position of the character. The curve rate 74 is determined by interpolation based on the curve rate 64 of each of the two control points adjacent to the current position of the character in a similar manner to that for the advancing direction vector 71.

The accumulated distance from the start point 75 represents a distance (a path) to the current position of the character from the start point of the course in the virtual game world. In the present embodiment, the distance (path) from the start point of the course in the virtual game world to the current position of the character on the forward direction line 76 described below is determined as the accumulated distance from the start point 75.

The current position of the character on the forward direction line 76 represents a position, on the forward direction line, corresponding to the current position 70 of the character. For example, as shown in FIG. 13, the current position of the character on the forward direction line 76 is determined as a position obtained by projecting, onto the forward direction line, the current position 70 of the character in the direction perpendicular to the forward direction line.

The internal speed 77 is a scalar value representing a magnitude of a movement speed of the character. The internal speed 77 is increased or reduced depending on a topography, or the acceleration instruction or the deceleration instruction from the player.

The leftward-rightward movement input value 78 is a scalar value representing a magnitude of a speed at which the character moves in the right direction. The leftward-rightward movement input value 78 is a positive value based on the rightward movement instruction from the player or a negative value based on the leftward movement instruction from the player.

The advance vector 79, the leftward-rightward movement vector 80, the inertial vector 81, and the gravitational vector 82 are used to determine, in each frame, a destination (that is, a moving direction and a moving distance) to which the character is moved.

Figure 12:
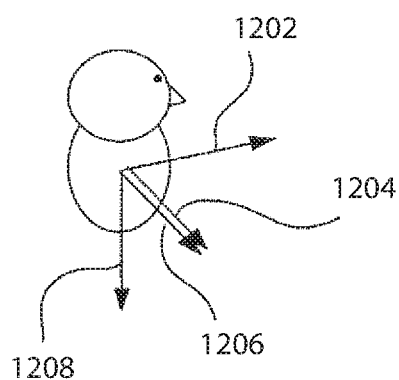
FIG. 12 is a diagram illustrating an advance vector, a leftward-rightward movement vector, an inertial vector and a gravitational vector.

The advance vector 79 has the same direction as the advancing direction vector 71 of the character as shown at 1202 in FIG. 12, and has a magnitude based on the internal speed 77.

The leftward-rightward movement vector 80 has the same direction as the right direction vector 73 of the character or the direction opposite to the direction of the right direction vector 73, as shown at 1206 in FIG. 12. The direction of the leftward-rightward movement vector 80 depends on a sign of the leftward-rightward movement input value 78. When the leftward-rightward movement input value 78 is positive (that is, a player inputs the rightward movement instruction), the leftward-rightward movement vector 80 has the same direction as the right direction vector 73 of the character. When the leftward-rightward movement input value 78 is negative (that is, a player inputs the leftward movement instruction), the leftward-rightward movement vector 80 has the direction opposite to the direction of the right direction vector 73 of the character. The leftward-rightward movement vector 80 has a magnitude based on an absolute value of the leftward-rightward movement input value 78.

The inertial vector 81 has the same direction as the right direction vector 73 of the character or the direction opposite to the direction of the right direction vector 73 of the character as shown at 1204 in FIG. 12. The inertial vector 81 is used to move, toward the outside of the curve, the character going around the curve by using centrifugal force. The direction of the inertial vector 81 depends on a sign of the curve rate 74 included in the character control data. When the sign of the curve rate 74 represents a right-hand curve, the inertial vector 81 has the direction opposite to the direction of the right direction vector 73 of the character. When the sign of the curve rate 74 represents a left-hand curve, the inertial vector 81 has the same direction as the right direction vector 73 of the character.

The gravitational vector 82 has the same direction as the upward direction vector 72 of the character or the direction opposite to the direction of the upward direction vector 72 of the character as shown at 1208 in FIG. 12. The gravitational vector 82 is used to cause the character to fly at the same height (the height in the virtual game world) as that of the forward direction line. The direction of the gravitational vector 82 depends on a larger/smaller relationship between the height of the current position 70 of the character and the height of the current position of the character on the forward direction line 76. When the current position 70 of the character has a greater height than the current position of the character on the forward direction line 76, the gravitational vector 82 has the direction opposite to the direction of the upward direction vector 73 of the character. When the current position 70 of the character has a smaller height than the current position of the character on the forward direction line 76, the gravitational vector 82 has the same direction as the upward direction vector 73 of the character.

The movement vector 83 is a vector obtained by combining the advance vector 79, the leftward-rightward movement vector 80, the inertial vector 81, and the gravitational vector 82. Based on the movement vector 83, the current position 70 of the character is updated in each frame as necessary.

The virtual camera control data 46 shown in FIG. 6 represents data (such as a virtual camera position, a sight point, an attitude and an angle of view) used to control a virtual camera positioned in the virtual game world so as to generate the game image. The virtual camera control data 46 is updated as necessary in accordance with the movement of the character.

Hereinafter, with reference to a flow chart shown in FIG. 10, a flow of a process performed by the CPU 31 based on the game program 40 will be described.

Figure 10:
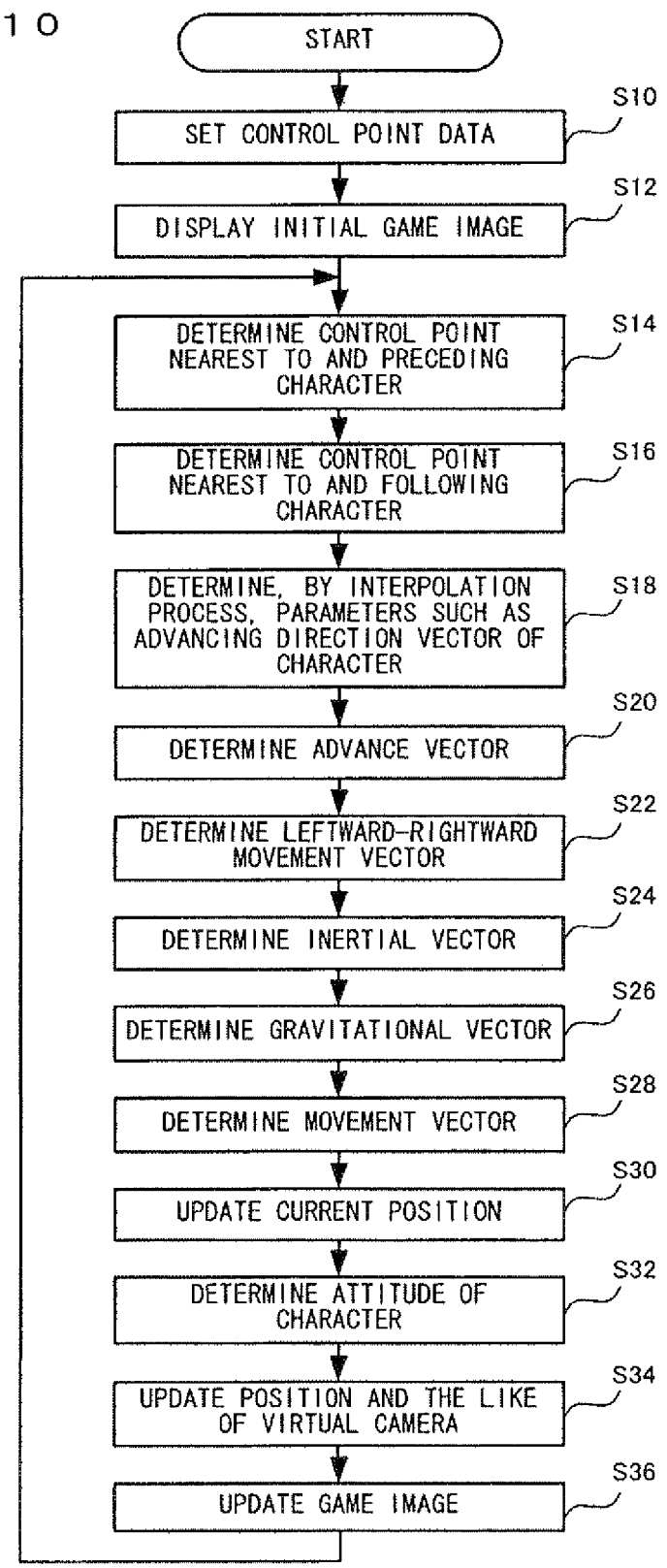
FIG. 10 is a flow chart showing a flow of a process performed by a CPU 31.

In FIG. 10, when execution of the game program 40 is started, the CPU 31 initially sets, based on the forward direction line data 43, the control points represented by the control point data 44, as described above, in step S10.

In step S12, an initial game image is displayed based on the game image data 41 and the race course data 42. At this time, each of parameters included in the character control data 45 is set so as to have an initial value.

In step S14, the control point nearest to the character among the control points preceding the character (that is, at the side of the start point on the course) is determined based on the current position 70 of the character and the three-dimensional coordinates 60 of each of the control points included in the control point data 44. For example, when the current position of the character corresponds to a point Pc shown in FIG. 13, the control point nearest to and preceding the character corresponds to the control point P3.

In step S16, the control point nearest to the character among the control points following the character (that is, at the side of the goal point on the course) is determined based on the current position 70 of the character and the three-dimensional coordinates 60 of each of the control points included in the control point data 44. For example, when the current position of the character corresponds to the point Pc shown in FIG. 13, the control point nearest to and following the character corresponds to the control point P4.

Various methods for determining the control points in step S14 and step S16 may be provided. One of the various methods is as follows. For example, the control point (control point P3 in an example shown in FIG. 13) nearest to the current position Pc of the character is obtained. An inner product of the forward direction vector (Xf3, Yf3, Zf3) (refer to FIG. 14) of the control point P3 and the three-dimensional coordinates (X3, Y3, Z3) of the control point P3 is subtracted from the inner product of the forward direction vector (Xf3, Yf3, Zf3) of the control point P3 and the current position (Xc, Yc, Zc) of the character. Depending on whether the subtraction result represents a positive value or a negative value, whether the control point P3 precedes or follows the character is determined. In the example shown in FIG. 13, the result of the subtraction based on the two inner products represents a positive value, and therefore the control point P3 is determined as the control point nearest to and preceding the character, and the control point P4 immediately following the control point P3 is determined as the control point nearest to and following the character.

Further, in step S14 and step S16, the control point nearest to the current position 70 of the character may be determined based on "the control point nearest to the character" having been used for an immediately preceding time. Specifically, for example, each time "the control point nearest to the character" is determined, information representing "the control point nearest to the character" is stored in the work memory 32 of the game apparatus body 3. When "the control point nearest to the character" is to be determined, the control points in the vicinity of (or following) "the control point nearest to the character" which has been used for the immediately preceding time are used as potential control points, and "the control point nearest to the character" may be determined from among the potential control points. For example, a distance between the current position 70 of the character and each of the control points following "the control point nearest to the character" having been used for the immediately preceding time is sequentially calculated. When the distance between the current position 70 of the character and a certain control point among the control points following "the control point nearest to the character" having been used for the immediately preceding time becomes greater than the distance between the current position 70 of the character and a control point immediately preceding the certain control point, the control point immediately preceding the certain control point is determined as "the control point nearest to the character".

In step S18, based on the control point data 44 representing each of the two control points having been determined in step S14 and step S16, the advancing direction vector 71, the upward direction vector 72, the right direction vector 73, the curve rate 74 and the accumulated distance from the start point 75 for the character are determined.

The advancing direction vector 71 of the character is determined through the interpolation based on the forward direction vectors 61 of each of the two control points having been determined in step S14 and step S16. A specific example of the method for determining the advancing direction vector 71 of the character will be described with reference to FIG. 14.

Figure 14:
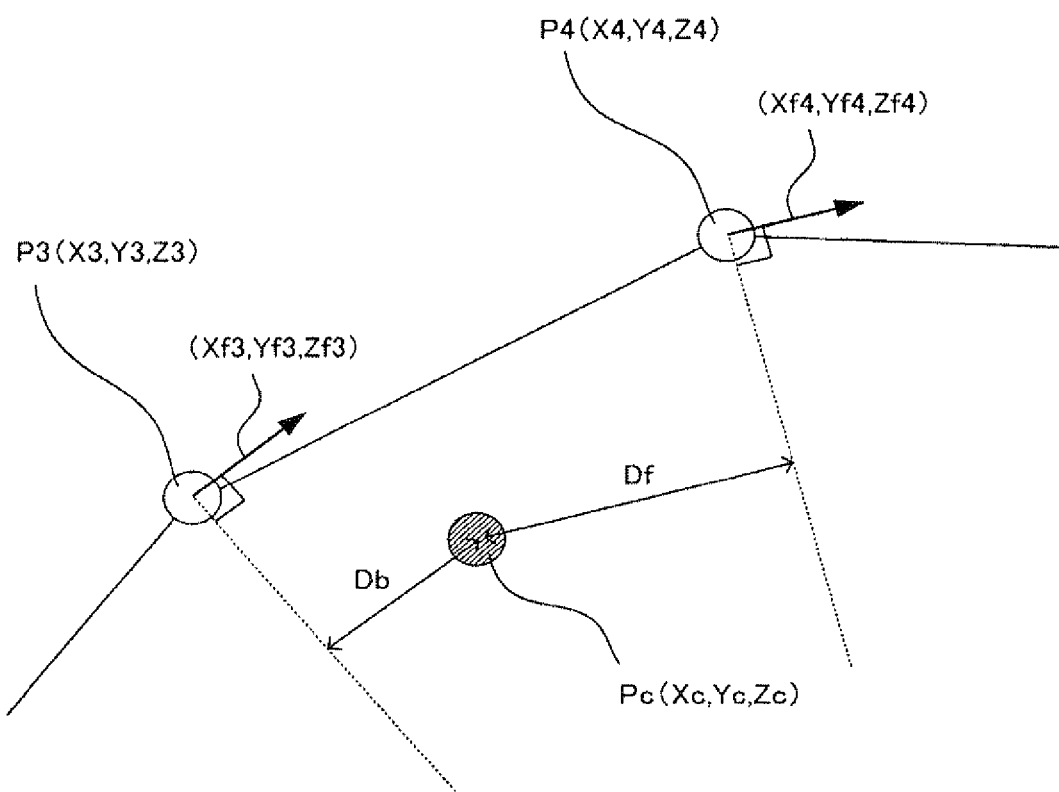
FIG. 14 is a diagram illustrating in detail interpolation process.

Firstly, a position of the character between the two control points P3 and P4 is determined. Specifically, a distance Db and a distance Df shown in FIG. 14 are obtained. The distance Db represents a distance to the character relative to the control point P3 in the direction represented by the forward direction vector (Xf3, Yf3, Zf3) of the control point P3. The distance Db is calculated by subtracting the inner product of the forward direction vector (Xf3, Yf3, Zf3) of the control point P3 and the three-dimensional coordinates (X3, Y3, Z3) of the control point P3 from the inner product of the forward direction vector (Xf3, Yf3, Zf3) of the control point P3 and the current position (Xc, Yc, Zc) of the character. The distance Df represents a distance to the character relative to the control point P4 in the direction represented by the forward direction vector (Xf4, Yf4, Zf4) of the control point P4. The distance Df is calculated by subtracting the inner product of the forward direction vector (Xf4, Yf4, Zf4) of the control point P4 and the current position (Xc, Yc, Zc) of the character from the inner product of the forward direction vector (Xf4, Yf4, Zf4) of the control point P4 and the three-dimensional coordinates (X4, Y4, Z4) of the control point P4.

Next, a weighted average of the forward direction vectors of the two control points P3 and P4 is obtained based on the distances Db and Df so as to obtain the advancing direction vector 71 of the character. Specifically, the advancing direction vector 71 of the character is calculated as ((Xf3, Yf3, Zf3).times.Db±(Xf4, Yf4, Zf4).times.Df)/(Db+Df). That is, the forward direction vector 61 of the control point which is the nearer to the character of the two control points P3 and P4 exerts a greater influence on the advancing direction vector 71 of the character.

The interpolation described above allows the direction of the advancing direction vector 71 of the character to smoothly vary in accordance with the movement of the character, thereby enabling improved control of the movement of the character in a natural manner.

The aforementioned method for determining the advancing direction vector 71 of the character is only an example. The advancing direction vector 71 of the character may be determined in a simplified manner or a complicated manner as compared to the aforementioned method. For example, the forward direction vector of the control point P3 nearest to the character may be determined as the advancing direction vector 71 of the character. In another exemplary method, the advancing direction vector 71 of the character may be determined based on the forward direction vectors of three or more control points. In still another exemplary method, a line tangent to the forward direction line at the current position of the character on the forward direction line 76 is detected, and the advancing direction vector 71 of the character may be determined so as to represent the direction of the line tangent to the forward direction line.

The upward direction vector 72, the right direction vector 73, and the curve rate 74 of the character may be determined in a similar manner. That is, the upward direction vector 72 of the character is obtained as a weighted average of the upward direction vectors of the two control points P3 and P4 based on the distances Db and Df. The right direction vector 73 of the character is obtained as a weighted average of the right direction vectors of the two control points P3 and P4 based on the distances Db and Df. The curve rate 74 is obtained as a weighted average of the curve rates of the two control points P3 and P4 based on the distances Db and Df.

The accumulate distance from the start point 75 is obtained by adding the distance Db to the accumulated distance from the start point 65 representing an accumulated distance from the start point to the control point P3. The accumulated distance from the start point 75 may be obtained by subtracting the distance Df from the accumulated distance from the start point 65 representing an accumulated distance from the start point to the control point P4.

In step S20, the advance vector 79 is determined. Specifically, the internal speed 77 is updated, and a vector having a magnitude represented by the internal speed 77 having been updated, and a direction represented by the advancing direction vector 71 of the character is set as the advance vector 79. An exemplary method for updating the internal speed 77 according to the present embodiment is as follows. A magnitude of the movement vector 83 determined in an immediately preceding frame is determined as the internal speed 77. Thereafter, when the acceleration instruction is inputted by a player, the internal speed 77 is increased, and when the deceleration instruction is inputted by a player, the internal speed 77 is reduced. At this time, the increased amount of the internal speed 77 or the reduced amount of the internal speed 77 may be determined in accordance with a speed at which the strike surface is repeatedly hit as described above. As described above, the magnitude of the advance vector 79 is determined based on the magnitude of the movement vector 83 having been determined in the immediately preceding frame, and therefore, unlike in the conventional art, it is possible to prevent the character going around a curve from accelerating or decelerating in an unnatural manner.

Further, when the acceleration instruction is not inputted by a player, the internal speed may not be reduced, that is, a value of the internal speed having been obtained in the immediately preceding frame may be maintained.

In step S22, the leftward-rightward movement vector 80 is determined. Specifically, the leftward-rightward movement input value 78 is updated, and a vector having a magnitude represented by the leftward-rightward movement input value 78 having been updated, and a direction represented by the right direction vector 73 of the character is set as the leftward-rightward movement vector 80. An exemplary method for updating the leftward-rightward movement input value 78 according to the present embodiment is as follows. When the rightward movement instruction is inputted by a player, the leftward-rightward movement input value 78 is set as a positive value, and when the leftward movement instruction is inputted by a player, the leftward-rightward movement input value 78 is set as a negative value. At this time, the absolute value of the leftward-rightward movement input value 78 may be determined depending on a speed at which the strike surface is repeatedly hit as described above.

In step S24, the inertial vector 81 is determined. Specifically, a vector having a magnitude based on a value of the curve rate 74, and the same direction as the right direction vector 73 of the character or a direction opposite to the direction of the right direction vector 73 of the character as described above is set as the inertial vector 81. That is, the vector to be set as the inertial vector 81 has a direction opposite to the direction of the right direction vector 73 of the character when the character goes around a right-hand curve, and has the same direction as the right direction vector 73 of the character when the character goes around a left-hand curve.

In step S26, the gravitational vector 82 is determined. Specifically, a vector having a predetermined magnitude and a direction based on a larger/smaller relationship between the height of the current position 70 of the character and the height of the current position of the character on the forward direction line 76 is set as the gravitational vector 82. Here, the predetermined magnitude may be constant, or depend on the height difference.

In step S28, the movement vector 83 is determined. Specifically, a vector obtained by combining the advance vector 79, the leftward-rightward movement vector 80, the inertial vector 81, and the gravitational vector 82, which are determined in steps S20, S22, S24, and S26, respectively, is set as the movement vector 83. The movement vector 83 may be corrected in consideration of influences of topography (ascending slope or friction), and air resistance.

In step S30, the current position 70 of the character is updated based on the movement vector 83 having been determined in step S28. Specifically, the current position 70 is updated so as to move the character over a distance represented by the movement vector 83 in a direction represented by the movement vector 83.

In the present embodiment, the direction represented by the movement vector may be referred to as "moving direction" and the direction represented by the advancing direction vector or the advance vector may be referred to as "advancing direction".

In step S32, an attitude of the character is determined. The attitude of the character may be determined based on the advancing direction vector 71 of the character, the upward direction vector 72, and the right direction vector 73 or may be determined regardless of these vectors. For example, when a player inputs the rightward movement instruction, the character may be sloped to the right so as not to be influenced by the upward direction vector 72 of the character.

In step S34, the virtual camera control data 46 is updated based on the current position 70 of the character. In a conventional typical race game, the virtual camera is positioned so as to pick up an image of the character from therebehind. However, in the present embodiment, a relative position of the virtual camera to the current position of the character is changed depending on the forward direction line.

Figure 15:
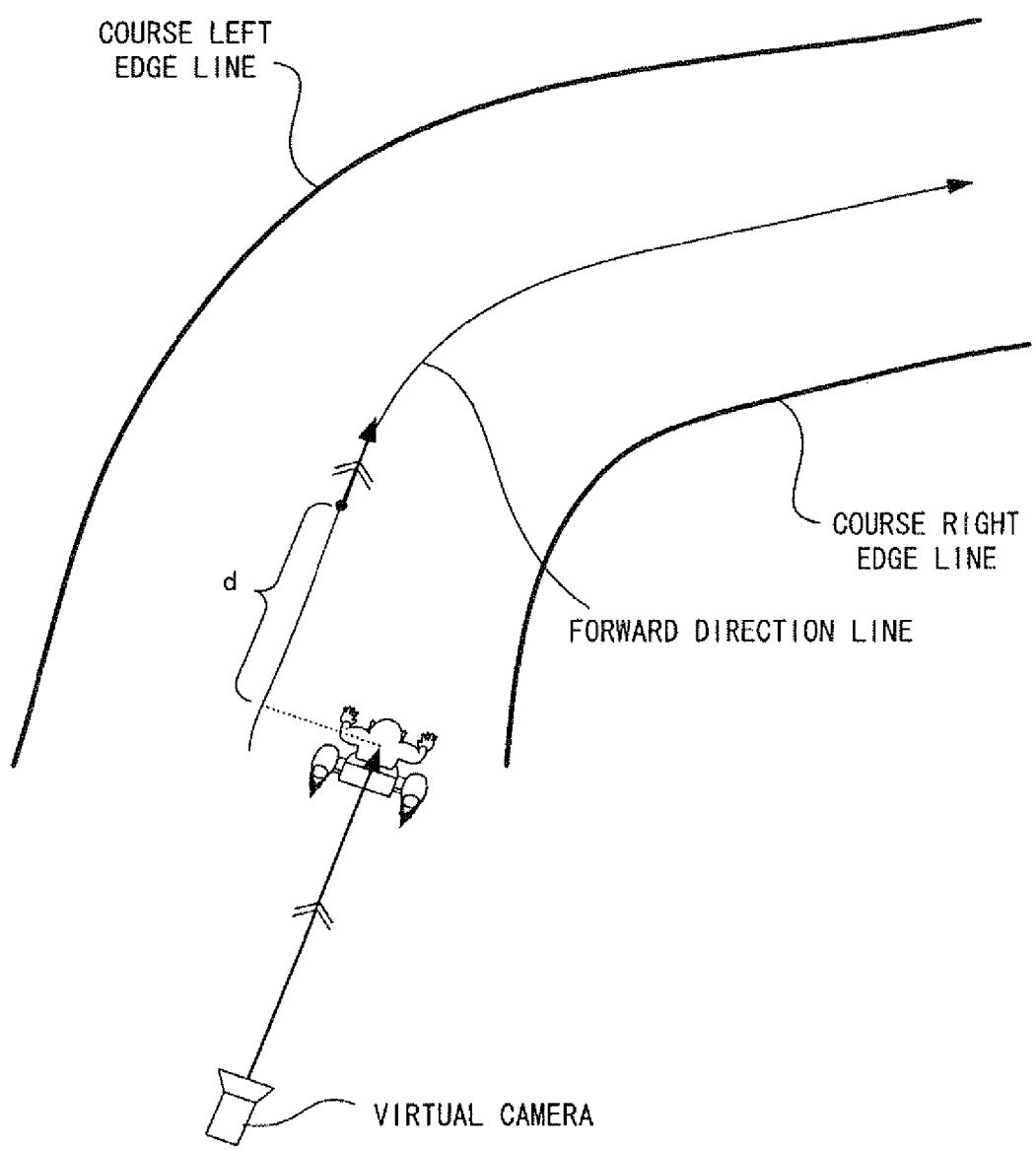
FIG. 15 is a diagram illustrating an example where a virtual camera is controlled.
Figure 16:
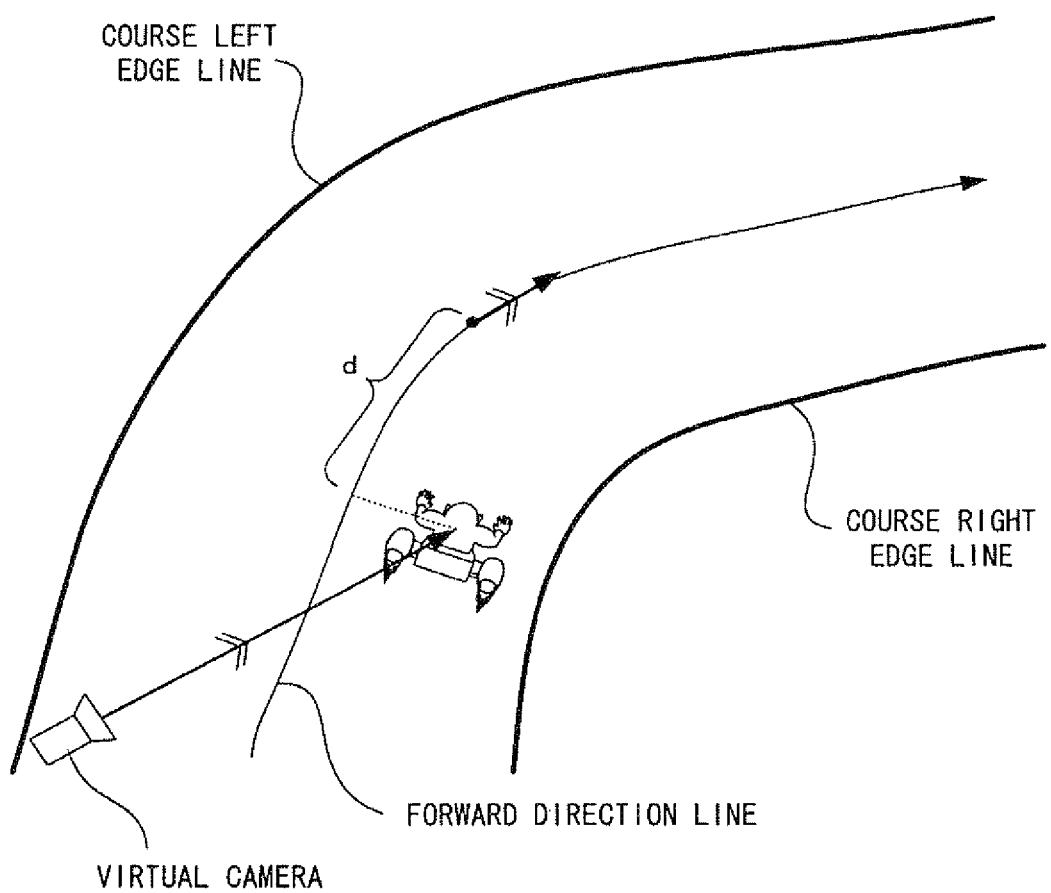
FIG. 16 is a diagram illustrating another example where the virtual camera is controlled.

Specifically, as shown in FIGS. 15 and 16, orientation of the virtual camera is updated, as necessary, so as to continue to be parallel to the forward direction (that is, the direction of the line tangent to the forward direction line) at a point distanced from the current position (more specifically, the current position of the character on the forward direction line) of the character by a predetermined distance d in the course forward direction. Therefore, for example, when the character is going around a blind curve as shown in FIG. 16, the virtual camera has its orientation updated so as to provide a view beyond the curve. Therefore, a player can control the character while confirming the view beyond the curve, thereby improving the controllability. The orientation of the virtual camera may be updated, as necessary, so as to continue to be parallel to the forward direction vector 61 of the control point following, by a predetermined number of control points, the control point nearest to the character, instead of the forward direction at the point distanced from the current position of the character by the predetermined distance d. The position of the virtual camera is determined based on the current position of the player character. For example, the virtual camera is positioned so as to be distanced from the current position (or, a position which is distanced from the current position of the player character by a predetermined distance (for example, a position which is distanced from the current position of the player character in the forward direction or the moving direction by a predetermined distance)) of the player character by a predetermined distance in the direction opposite to the direction corresponding to the orientation of the virtual camera having been determined as described above.

Figure 17:
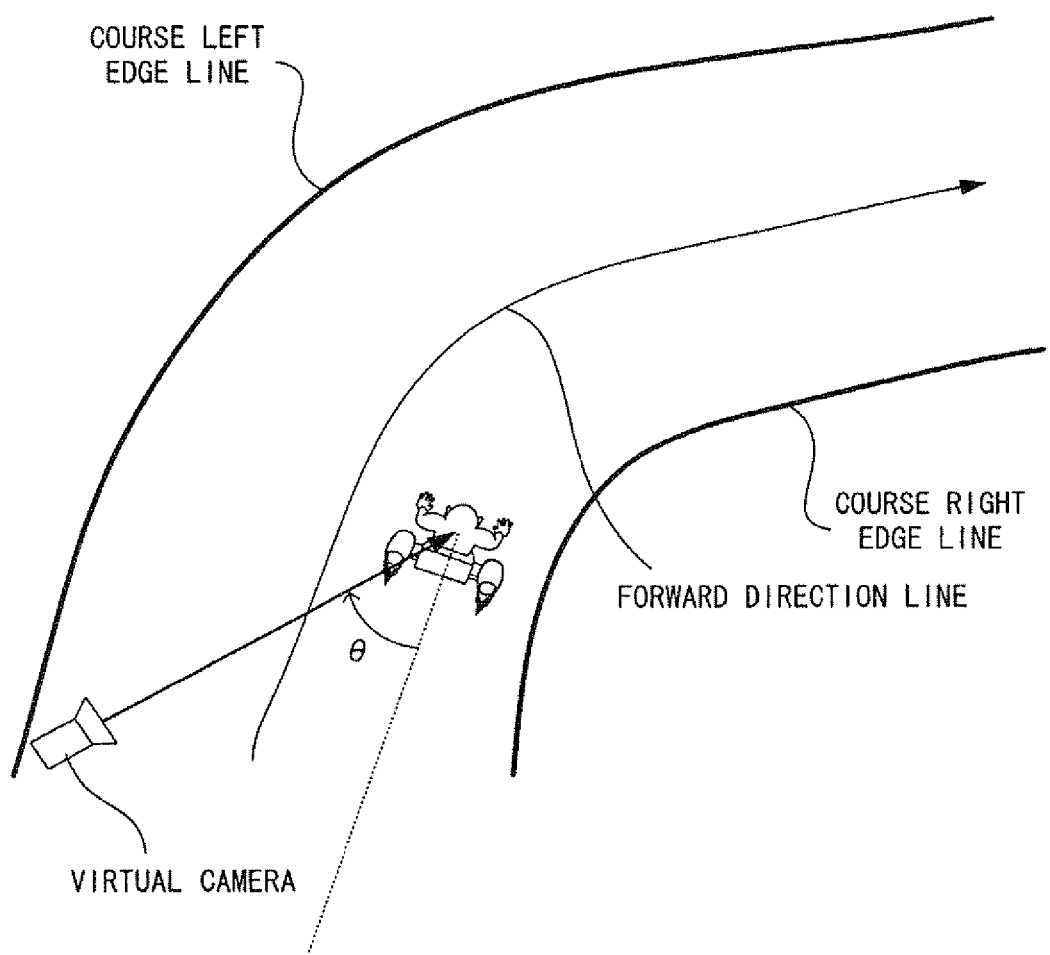
FIG. 17 is a diagram illustrating still another example where the virtual camera is controlled.

Further, the relative angle θ of the virtual camera to the advancing direction of the character may be changed depending on the curvature of the forward direction line at either the current position (more specifically, the current position on the forward direction line) of the character or a point following the current position of the character by a predetermined distance as shown in FIG. 17, instead of controlling the position and the orientation of the virtual camera based on the forward direction indicated by the forward direction line. Further, the relative angle .theta. of the virtual camera to the advancing direction of the character may be changed depending on the curve rate 74.

In step S36, the game image is updated based on the current position 70 of the character having been updated in step S30, the attitude of the character having been determined in step S32, and the virtual camera control data 46 having been updated in step S34. The process is returned to step S14.

The process of steps S14, S16, S18, S20, S22, S24, S26, S28, S30, S32, S34, and S36 described above is repeated in a predetermined cycle (for example, every 1/60 seconds), so as to display, on the screen of the television 2, the state of the character moving on the course in accordance with the instruction from a player.

As described above, according to the present embodiment, the advancing direction of the character is automatically corrected so as to continue to be parallel to the forward direction indicated by the forward direction line. Therefore, when the character goes around a curve, a player is allowed to appropriately move the character by performing a simple operation without considering the current moving direction of the character. For example, in a conventional race game, when a player fails to appropriately control the character in accordance with the curvature of the curve, the character is moved toward the inside or the outside of the course, thereby causing the character to easily slide off the course. However, according to the present embodiment, even when a player fails to control the character, the character is prevented from moving toward the inside or the outside of the course, thereby preventing the character from easily sliding off the course.

Further, the advancing direction of the character is automatically corrected as described above, and therefore it is unnecessary for a player to repeatedly hit the strike surfaces of the conga controller 6 when the character goes around a sharp curve, thereby enabling a player poor at repeatedly hitting the strike surfaces to easily operate the character.

Moreover, according to the present embodiment, when the character goes around a curve, the movement speed of the character is basically maintained, and therefore a player is able to enjoy running through the course at a high movement speed without worrying about sliding off the course. In particular, even when the character runs a complicated course including a lot of curves, it is unnecessary to reduce the movement speed each time the character goes around the curve, thereby allowing a player to constantly enjoy running the course at the high movement speed with excitement. Further, the operation inputted by the player also influences the moving direction of the player object, and therefore it is possible to represent the technique of the player in the game, whereby the operation corrected by the computer does not deprive the player of the enjoyment and excitement provided by the game.

As described above, the forward direction line may be branched or the forward direction lines may be merged. For example, when the forward direction line is branched as shown in FIG. 18, the control point P12 representing the branching point may have set therefor the forward direction vector 61, the upward direction vector 62, the right direction vector 63, and the curve rate 64 for each of a route, from the control point P12, including the control point P13 and a route, from the control point P12, including the control point P20. When the route in which the character is to travel is determined, the advancing direction vector 71 of the character, the upward direction vector 72 and the like may be determined based on the forward direction vector 61, the upward direction vector 62, the right direction vector 63, and the curve rate 64 corresponding to the route in which the character is to travel. An exemplary method for determining the route in which the character is to travel is as follows. The control point (the control point P13 in an example shown in FIG. 18) which is the nearer, to the current position Pc of the character, of the two control points P13 and P20 each of which immediately follows the control point P12 representing the branching point may be determined as a point included in the route in which the character is to travel. One of the route including the control point P13 and the route including the control point P20 may be active depending on whether or not the game state data satisfies a predetermined condition (for example, by using, as a switch, a gimmick and the like in the course).

The forward direction line is not necessarily provided along the course. For example, the forward direction line (P40→P41→P33) as shown in FIG. 19 may be provided. In this case, even when a player fails to operate the character and therefore the character strands at the position Pc shown in FIG. 19, the advancing direction of the character is automatically changed to the direction of the control point P33 based on the forward direction line (P40→P41→P33). Therefore, the player is allowed to easily move the player character to a favorable position by simply inputting the acceleration instruction and the leftward movement instruction for slightly moving the player character in the left direction.

While certain example embodiments have described in detail, the foregoing description is in all aspects illustrative and not restrictive. It is understood that numerous other modifications and variations can be devised without departing from the scope of the invention

The invention claimed is:

1. A non-transitory computer-readable storage medium having stored thereon a game program for moving an object on a course in a virtual game world, the game program comprising instructions that cause a computer of a game apparatus to:
set a virtual camera in the virtual game world, wherein the virtual camera is set to shoot the course based on a course direction;
generate, based on the set virtual camera, an image of the virtual game world, the generated image including the object;
display the generated image on a screen of a display device;
determine a first vector based at least on a current position of the object in the virtual game world and direction data set at a control point on the course during gameplay of the game program, wherein the first vector is along the course direction;
detect an instruction inputted by the player;
determine a second vector based at least on the instruction by the player, wherein a direction of the second vector is based on a direction of the instruction; and
move the object based at least on the first vector and the second vector while the instruction is detected.

2. The non-transitory computer-readable storage medium according to claim 1, wherein the game program comprises further instructions that cause the computer to move the object on the course within the virtual game world without using the second vector while the instruction is not detected.

3. The non-transitory computer-readable storage medium according to claim 1, wherein the game program comprises further instructions that cause the computer to move the object on the course within the virtual game world with the first vector to advance along the course in the virtual game world while the instruction is not detected.

4. The non-transitory computer-readable storage medium according to claim 1, wherein the game program comprises further instructions that cause the computer to move the object on the course based on an inertial vector.

5. The non-transitory computer-readable storage medium according to claim 1, wherein the first vector is determined based at least on the direction data set at the control point in the virtual game world determined at least by the current position of the object.

6. The non-transitory computer-readable storage medium according to claim 1, wherein the first vector is determined based at least on two directions that are associated with two control points in the virtual game world determined at least by the current position of the object.

7. The non-transitory computer-readable storage medium according to claim 1, wherein the first vector and the second vector are orthogonal.

8. The non-transitory computer-readable storage medium according to claim 1, wherein the object includes a player object.

9. The non-transitory computer-readable storage medium according to claim 1, wherein the game program comprises further instructions that cause the computer of the game apparatus to adjust a pose of the virtual camera in accordance with movement of the object.

10. The non-transitory computer-readable storage medium according to claim 1, wherein the virtual camera is set based on a position of the object on the course.

11. A game apparatus comprising:
an input device configured to receive input from a user;
a processing system that includes at least one hardware processor, the processing system configured to:
execute a game program for moving an object on a course that is located in a virtual game world;
set a virtual camera in the virtual game world, wherein the virtual camera is orientated in a direction that is based on a course direction;
generate, based on the set virtual camera, an image of the virtual game world, the generated image including the object;
display the generated image on a screen of a display device;
determine a first vector based at least on a current position of the object in the virtual game world and direction data set at a control point on the course during gameplay of the game program, wherein the first vector is along the course direction;
detect an instruction inputted by the player;
determine a second vector based at least on the instruction by the player, wherein a direction of the second vector is based on a direction of the instruction; and
move the object based at least on the first vector and the second vector.

12. The game apparatus of claim 11, wherein the relative position of the virtual camera to the object is adjusted based on a calculated forward direction that is used to control forward movement of the object in the virtual game world.

13. A method operated on a computer system that is configured to store a video game program that includes gameplay for moving an object on a course that is located in a virtual game world, the method comprising:
setting a virtual camera in the virtual game world, wherein the virtual camera is set to shoot the course based on a course direction;
generating, based on the set virtual camera, an image of the virtual game world, the generated image including the object;
outputting the generated image to a screen of a display device for display thereon;
determining a first vector based at least on a current position of the object in the virtual game world and direction data set at a control point on the course during gameplay of the game program, wherein the first vector is along the course direction;
processing an instruction that has been provided by a user of the computer system;

determining a second vector based at least on the instruction by the player, wherein a direction of the second vector is based on a direction of the instruction; and moving the object based at least on the first vector and the second vector while the instruction is detected.

14. A computer system comprising:

a non-transitory computer readable storage medium configured to store a video game program for moving an object on a course that is located in a virtual game world;

at least one hardware processor configured to:

set a virtual camera in the virtual game world, wherein the virtual camera is set to shoot the course based on a course direction;

generate, based on the set virtual camera, an image of the virtual game world, the generated image including the object;

display the generated image on a screen of a display device;

determine a first vector based at least on a current position of the object in the virtual game world and direction data set at a control point on the course during gameplay of the game program, wherein the first vector is along the course direction;

detect an instruction inputted by the player;

determine a second vector based at least on the instruction by the player, wherein a direction of the second vector is based on a direction of the instruction; and move the object based at least on the first vector and the second vector while the instruction is detected.

15. The computer system of claim 14, wherein the at least one processor is further configured to move the object on the course within the virtual game world without using the second vector while the instruction is not detected.

16. The computer system of claim 14, wherein the at least one processor is further configured to move the object on the course based on an inertial vector.

17. The computer system of claim 14, wherein the first vector is determined based at least on the direction data set at the control point in the virtual game world determined at least by the current position of the object.

18. The computer system of claim 14, wherein the at least one processor is further configured to adjust a pose of the virtual camera in accordance with movement of the object.

19. The computer system of claim 14, wherein the virtual camera is set based on a position of the object on the course.

20. The computer system of claim 14, wherein the at least one processor is further configured to move the object on the course within the virtual game world with the first vector to advance along the course in the virtual game world while the instruction is not detected.

* * * * *